United States Patent
Ramamoorthy et al.

(10) Patent No.: US 11,900,797 B2
(45) Date of Patent: Feb. 13, 2024

(54) AUTONOMOUS VEHICLE PLANNING

(71) Applicant: Five AI Limited, Bristol (GB)

(72) Inventors: Subramanian Ramamoorthy, Edinburgh (GB); Mihai Dobre, Edinburgh (GB); Roberto Antolin, Edinburgh (GB); Stefano Albrecht, Edinburgh (GB); Simon Lyons, Edinburgh (GB); Svetlin Valentinov Penkov, Edinburgh (GB); Morris Antonello, Edinburgh (GB); Francisco Eiras, Edinburgh (GB)

(73) Assignee: Five AI Limited, Cambridge (GB)

(*) Notice: Subject to any disclaimer, the term of this patent is extended or adjusted under 35 U.S.C. 154(b) by 135 days.

(21) Appl. No.: 17/285,277

(22) PCT Filed: Oct. 16, 2019

(86) PCT No.: PCT/EP2019/078072
§ 371 (c)(1),
(2) Date: Apr. 14, 2021

(87) PCT Pub. No.: WO2020/079074
PCT Pub. Date: Apr. 23, 2020

(65) Prior Publication Data
US 2021/0370980 A1    Dec. 2, 2021

(30) Foreign Application Priority Data

Oct. 16, 2018 (GB) .................................. 1816850
Oct. 16, 2018 (GB) .................................. 1816852
Oct. 16, 2018 (GB) .................................. 1816853

(51) Int. Cl.
*G08G 1/01* (2006.01)
*B60W 60/00* (2020.01)
(Continued)

(52) U.S. Cl.
CPC ........... *G08G 1/0116* (2013.01); *B60W 40/04* (2013.01); *B60W 50/0097* (2013.01);
(Continued)

(58) Field of Classification Search
CPC ........... G08G 1/0116; B60W 60/0015; B60W 60/0013; B60W 60/0027; B60W 40/04;
(Continued)

(56) References Cited

U.S. PATENT DOCUMENTS 9,187,088 B1    11/2015    Ferguson et al.
10,275,664 B2 *  4/2019    Mullen ............... G08G 1/09626
(Continued)

FOREIGN PATENT DOCUMENTS

JP    2005346371 A    12/2005
JP    2008210051 A    9/2008
(Continued)

OTHER PUBLICATIONS

International Search Report and Written Opinion for International Application No. PCT/EP2019/078072 dated May 13, 2020.
(Continued)

*Primary Examiner* — Hussein Elchanti
(74) *Attorney, Agent, or Firm* — Andrew J. Tibbetts; Greenberg Traurig, LLP

(57) ABSTRACT

An autonomous vehicle (AV) planning method comprises: receiving sensor inputs pertaining to an AV; processing the AV sensor inputs to determine an encountered driving scenario; in an AV planner, executing a tree search algorithm to determine a sequence of AV manoeuvres corresponding to a path through a constructed game tree; and generating AV control signals for executing the determined sequence of AV manoeuvres; wherein the game tree has a plurality of nodes representing anticipated states of the encountered driving scenario, and the anticipated driving scenario state of each
(Continued)

child node is determined by updating the driving scenario state of its parent node based on (i) a candidate AV manoeuvre and (ii) an anticipated behaviour of at least one external agent in the encountered driving scenario.

20 Claims, 18 Drawing Sheets

(51) Int. Cl.
| | | |
|---|---|---|
| *B60W 40/04* | (2006.01) | |
| *B60W 50/00* | (2006.01) | |
| *G05B 13/02* | (2006.01) | |
| *G05B 13/04* | (2006.01) | |
| *G06T 7/20* | (2017.01) | |
| *H04N 7/18* | (2006.01) | |
| *G06V 20/54* | (2022.01) | |
| *G06F 18/24* | (2023.01) | |
| *G06F 18/214* | (2023.01) | |
| *G06F 18/20* | (2023.01) | |
| *G06N 3/045* | (2023.01) | |
| *G06V 10/84* | (2022.01) | |
| *G06V 20/56* | (2022.01) | |

(52) U.S. Cl.
CPC .... *B60W 60/0013* (2020.02); *B60W 60/0015* (2020.02); *B60W 60/0027* (2020.02); *G05B 13/027* (2013.01); *G05B 13/04* (2013.01); *G06F 18/214* (2023.01); *G06F 18/24* (2023.01); *G06F 18/295* (2023.01); *G06N 3/045* (2023.01); *G06T 7/20* (2013.01); *G06V 10/84* (2022.01); *G06V 20/54* (2022.01); *G06V 20/56* (2022.01); *H04N 7/183* (2013.01); *B60W 2540/30* (2013.01); *B60W 2554/4046* (2020.02); *G06T 2207/20081* (2013.01); *G06T 2207/20084* (2013.01); *G06T 2207/30236* (2013.01); *G06T 2207/30241* (2013.01)

(58) Field of Classification Search
CPC ..... B60W 50/0097; B60W 2554/4046; B60W 2540/30; G06V 10/84; G06V 20/54; G06V 20/56; G06F 18/24; G06F 18/295; G06F 18/214; G06N 3/045; G05B 13/027; G05B 13/04; G06T 7/20; G06T 2207/20081; G06T 2207/20084; G06T 2207/30236; G06T 2207/30241; H04N 7/183
See application file for complete search history.

(56) References Cited

U.S. PATENT DOCUMENTS

| | | | | |
|---|---|---|---|---|
| 11,015,948 | B2* | 5/2021 | Okamoto | G01C 21/3655 |
| 11,112,795 | B1* | 9/2021 | Mandi | G05D 1/0214 |
| 11,237,554 | B2* | 2/2022 | Rezaeian | G06F 3/013 |
| 11,250,695 | B2* | 2/2022 | Mielenz | G08G 1/096783 |
| 2014/0336913 | A1* | 11/2014 | Fino | G01C 21/3691 |
| | | | | 701/465 |
| 2015/0145995 | A1* | 5/2015 | Shahraray | H04W 4/021 |
| | | | | 348/148 |
| 2017/0088038 | A1* | 3/2017 | Geller | B60Q 1/5037 |
| 2018/0089563 | A1 | 3/2018 | Redding et al. | |
| 2018/0090001 | A1* | 3/2018 | Fletcher | G08G 1/096725 |
| 2019/0310627 | A1* | 10/2019 | Halder | G05D 1/0033 |
| 2019/0310650 | A1* | 10/2019 | Halder | G06N 3/084 |

FOREIGN PATENT DOCUMENTS

| | | | |
|---|---|---|---|
| JP | | 2016004478 A | 1/2016 |
| JP | | 2016051465 A | 4/2016 |
| JP | | 2016070805 A | 5/2016 |
| JP | | 2018055141 A | 4/2018 |
| WO | WO 2017/138664 | A1 | 8/2017 |
| WO | | 2018131322 A2 | 7/2018 |
| WO | WO 2018/162521 | A1 | 9/2018 |

OTHER PUBLICATIONS

Deo et al., How would surround vehicles move? A Unified Framework for Maneuver Classification and Motion Prediction. ArXiv preprint ArXiv: 1801.06523v1. Jan. 19, 2018;1:1-12.
Houenou et al., Vehicle trajectory prediction based on motion model and maneuver recognition. 2013 IEEE/RSJ international conference on intelligent robots and systems (IROS). Nov. 3, 2013:4363-4369.
Translation of Office Action issued in Japanese Patent Application No. 2021-546461, dated Nov. 8, 2022 (5 pages).
Translation of Office Action issued in Japanese Patent Application No. 2021-546462, dated Nov. 1, 2022 (8 pages).
International Search Report and Written Opinion for International Application No. PCT/EP2019/078062 dated Feb. 25, 2020.
Ajanovic et al., Search-based optimal motion planning for automated driving. arXiv preprint arXiv:1803.04868. Aug. 3, 2018:8 pages.
Albrecht et al., Autonomous agents modelling other agents: A comprehensive survey and open problems. Artificial Intelligence. May 1, 2018;258:66-95.
Albrecht et al., Belief and truth in hypothesised behaviours. Artificial Intelligence. Jun. 1 2016;235:63-94.
Albrecht et al., Interpretable Goal-based Prediction and Planning for Autonomous Driving. arXiv:2002.02277v3. Mar. 15, 2021:7 pages.
Andersen et al., Trajectory optimization for autonomous overtaking with visibility maximization. 2017 IEEE 20th International Conference on Intelligent Transportation Systems (ITSC) Oct. 16, 2017:8 pages.
Auer et al., Finite-time analysis of the multiarmed bandit problem. Machine learning. May 2002;47(2):235-56.
Badue et al., Self-Driving Cars: A Survey. arXiv preprint arXiv:1901. 04407. Jan. 14, 2019:34 pages.
Bahram et al., A game-theoretic approach to replanning-aware interactive scene prediction and planning. IEEE Transactions on Vehicular Technology. Dec. 11, 2015;65(6):3981-92.
Baker et al., Action understanding as inverse planning. Cognition. Dec. 1, 2009;113(3):329-49.
Bandyopadhyay et al., Algorithmic foundations of robotics X 2013. Springer:475-91.
Bast et al., Route Planning in Transportation Networks. arXiv preprint arXiv:1504.05140. Apr. 20, 2015;65 pages.
Best et al., AutonoVi: Autonomous Vehicle Planning with Dynamic Maneuvers and Traffic Constraints. arXiv preprint arXiv:1703. 08561. Mar. 29, 2017:9 pages.
Brechtel et al., Probabilistic decision-making under uncertainty for autonomous driving using continuous POMDPs. 17th international IEEE conference on intelligent transportation systems (ITSC) Oct. 8, 2014:9 pages.
Browne et al., A survey of monte carlo tree search methods. IEEE Transactions on Computational Intelligence and AI in games. Feb. 3, 2012;4(1):1-43.
Cai et al., Lets-drive: Driving in a crowd by learning from tree search. arXiv preprint arXiv:1905.12197. May 29, 2019:9 pages.
Carvalho et al., Automated driving: The role of forecasts and uncertainty—A control perspective. European Journal of Control preprint. Jul. 1, 2015;24:45 pages.
Chai et al., Multipath: Multiple probabilistic anchor trajectory hypotheses for behavior prediction. arXiv preprint arXiv:1910. 05449. Oct. 12, 2019:12 pages.
Chen et al., Model-free Deep Reinforcement Learning for Urban Autonomous Driving. arXiv preprint arXiv:1904.09503. Oct. 21, 2019:7 pages.

(56) References Cited

OTHER PUBLICATIONS

Cheung et al., Efficient and safe vehicle navigation based on driver behavior classification. Proceedings of the IEEE Conference on Computer Vision and Pattern Recognition Workshops 2018:1037-44.
Chou et al., Learning constraints from demonstrations. arXiv preprint arXiv:1812.07084. Feb. 21 2019:25 pages.
Cunningham et al., MPDM: Multipolicy decision-making in dynamic, uncertain environments for autonomous driving. 2015 IEEE International Conference on Robotics and Automation (ICRA) May 26, 2015:8 pages.
Dong et al., Intention estimation for ramp merging control in autonomous driving. 2017 IEEE intelligent vehicles symposium (IV) Jun. 11, 2017:6 pages.
Dong et al., Smooth behavioral estimation for ramp merging control in autonomous driving. 2018 IEEE Intelligent Vehicles Symposium (IV) Jun. 26, 2018;6 pages.
Düring et al., Cooperative decentralized decision making for conflict resolution among autonomous agents. 2014 IEEE International Symposium on Innovations in Intelligent Systems and Applications (INISTA) Proceedings Jun. 23, 2014:154.
Evestedt et al., Interaction aware trajectory planning for merge scenarios in congested traffic situations. 2016 IEEE 19th International Conference on Intelligent Transportation Systems (ITSC) Nov. 1, 2016:465-72.
Fisac et al., Hierarchical Game-Theoretic Planning for Autonomous Vehicles. arXiv preprint arXiv:1810.05766. Oct. 13, 2018:7 pages.
Galceran et al., Multipolicy Decision-Making for Autonomous Driving via Changepoint-based Behavior Prediction. University of Michigan. 2015:10 pages.
Galceran et al., Multipolicy decision-making for autonomous driving via changepoint-based behavior prediction: Theory and experiment. Autonomous Robots. Aug. 2017;41(6):16 pages.
Gámez Serna et al., Dynamic speed adaptation for path tracking based on curvature information and speed limits. Sensors. Jun. 2017;17(6):1383.
Gindele et al., Learning driver behavior models from traffic observations for decision making and planning. IEEE Intelligent Transportation Systems Magazine. Jan. 19, 2015;7(1):69-79.
González et al., A review of motion planning techniques for automated vehicles. IEEE Transactions on Intelligent Transportation Systems. Nov. 26, 2015; 17(4):13 pages.
Hardy et al., Contingency planning over probabilistic hybrid obstacle predictions for autonomous road vehicles. 2010 IEEE/RSJ International Conference on Intelligent Robots and Systems Oct. 18, 2010:2237-42.
Hart et al., A formal basis for the heuristic determination of minimum cost paths. IEEE transactions on Systems Science and Cybernetics. Jul. 1968;4(2):100-7.
He et al., Efficient planning under uncertainty with macro-actions. Journal of Artificial Intelligence Research. Mar. 1, 2011;40:523-70.
Hoel et al., Automated Speed and Lane Change Decision Making using Deep Reinforcement Learning. arXiv preprint arXiv:1803.10056. Nov. 1, 2018:8 pages.
Hoermann et al., Probabilistic long-term prediction for autonomous vehicles. 2017 IEEE Intelligent Vehicles Symposium (IV) Jun. 11, 2017:7 pages.
Hubmann et al., A belief state planner for interactive merge maneuvers in congested traffic. 2018 21st International Conference on Intelligent Transportation Systems (ITSC) Nov. 4, 2018:1617-24.
Hubmann et al., Automated Driving in Uncertain Environments: Planning with Interaction and Uncertain Maneuver Prediction. IEEE Transactions on Intelligent Vehicles. 2017:14 pages.
Hubmann et al., Decision Making for Autonomous Driving considering Interaction and Uncertain Prediction of Surrounding Vehicles. Jun. 2017:9 pages.
Jain et al., Multi-Fidelity Recursive Behavior Prediction. arXiv preprint arXiv:1901.01831. Dec. 18, 2018:6 pages.
Kim et al., Probabilistic vehicle trajectory prediction over occupancy grid map via recurrent neural network. ArXiv preprint ArXiv: 1704.07049v2. Sep. 1, 2017;2:1-6.
Kocsis et al., Bandit based monte-carlo planning. European conference on machine learning. Springer. Sep. 18, 2006:282-93.
Koschi et al., Spot: A tool for set-based prediction of traffic participants. 2017 IEEE Intelligent Vehicles Symposium (IV) Jun. 11, 2017:8 pages.
Kurzer et al., Decentralized Cooperative Planning for Automated Vehicles with Continuous Monte Carlo Tree Search. IEEE ITSC. arXiv preprint arXiv:1809.03200. Sep. 10, 2018:8 pages.
Kurzer et al., Decentralized Cooperative Planning for Automated Vehicles with Hierarchical Monte Carlo Tree Search. IEEE IV. arXiv preprint arXiv: 1807.09530. Jul. 25, 2018:8 pages.
Kwon et al., When Humans Aren't Optimal: Robots that Collaborate with Risk-Aware Humans. arXiv preprint arXiv:2001.04377. Jan. 13, 2020:10 pages.
Lee et al., Desire: Distant future prediction in dynamic scenes with interacting agents. Proceedings of the IEEE Conference on Computer Vision and Pattern Recognition 2017:336-45.
Lenz et al., Deep neural networks for Markovian interactive scene prediction in highway scenarios. 2017 IEEE Intelligent Vehicles Symposium (IV) Jun. 11, 2017:685-92.
Lenz et al., Tactical cooperative planning for autonomous highway driving using Monte-Carlo Tree Search. 2016 IEEE Intelligent Vehicles Symposium (IV) Jun. 19, 2016:447-53.
Levine et al., Continuous inverse optimal control with locally optimal examples. Proceedings of the 29th International Conference on International Conference on Machine Learning Jun. 26, 2012:8 pages.
Li et al., Game-Theoretic Modeling of Driver and Vehicle Interactions for Verification and Validation of Autonomous Vehicle Control Systems. IEEE TCST. arXiv preprint arXiv:1608.08589. Aug. 30, 2016:13 pages.
Liu et al., Situation-aware decision making for autonomous driving on urban road using online POMDP. 2015 IEEE Intelligent Vehicles Symposium (IV) Jun. 28, 2015:9 pages.
Niekum et al., Online bayesian changepoint detection for articulated motion models. 2015 IEEE International Conference on Robotics and Automation (ICRA) May 26, 2015:8 pages.
Nishi et al., Freeway Merging in Congested Traffic based on Multipolicy Decision Making with Passive Actor Critic. arXiv preprint arXiv:1707.04489. Jul. 14, 2017:6 pages.
Paden et al., A Survey of Motion Planning and Control Techniques for Self-driving Urban Vehicles. arXiv preprint arXiv:1604.07446. Apr. 25, 2016:27 pages.
Paxton et al., Combining Neural Networks and Tree Search for Task and Motion Planning in Challenging Environments. arXiv preprint arXiv:1703.07887. Mar. 22, 2017:8 pages.
Pendleton et al., Perception, planning, control, and coordination for autonomous vehicles. Machines. Mar. 2017;5(1):54 pages.
Ramírez et al., Probabilistic plan recognition using off-the-shelf classical planners. InTwenty-Fourth AAAI Conference on Artificial Intelligence Jul. 4, 2010:1121-26.
Rasouli et al., Autonomous vehicles that interact with pedestrians: A survey of theory and practice. IEEE transactions on intelligent transportation systems. Mar. 15, 2019;21(3):900-18.
Rhinehart et al., Precog: Prediction conditioned on goals in visual multi-agent settings. Proceedings of the IEEE/CVF International Conference on Computer Vision 2019:2821-30.
Rudenko et al., Human Motion Trajectory Prediction: A Survey. arXiv preprint arXiv:1905.06113. May 15, 2019:37 pages.
Sadigh et al., Information Gathering Actions over Human Internal State. UC Berkeley. Nov. 28, 2016:9 pages.
Sadigh et al., Planning for autonomous cars that leverage effects on human actions. Robotics: Science and Systems Jun. 18, 2016:1-9.
Sallab et al., Deep reinforcement learning framework for autonomous driving. Electronic Imaging. Jan. 29, 2017;2017(19):70-6.
Sauer et al., Conditional affordance learning for driving in urban environments. Conference on Robot Learning (CoRL) Oct. 23, 2018:16 pages.
Schreier et al., Bayesian, maneuver-based, long-term trajectory prediction and criticality assessment for driver assistance systems.

(56) References Cited

OTHER PUBLICATIONS

17th International IEEE Conference on Intelligent Transportation Systems (ITSC). Oct. 8, 2014:8 pages.

Schulz et al., Interaction-Aware Probabilistic Behavior Prediction in Urban Environments. arXiv preprint arXiv:1804.10467. Aug. 28, 2018:8 pages.

Schwarting et al., Planning and decision-making for autonomous vehicles. Annual Review of Control, Robotics, and Autonomous Systems. May 28, 2018;1:187-210.

Schwarting et al., Recursive conflict resolution for cooperative motion planning in dynamic highway traffic. 17th International IEEE Conference on Intelligent Transportation Systems (ITSC) Oct. 8, 2014:1039-44.

Shalev-Shwartz et al., Safe, multi-agent, reinforcement learning for autonomous driving. arXiv preprint arXiv:1610.03295. Oct. 11, 20161:13 pages.

Somani et al., DESPOT: Online POMDP planning with regularization. Advances in neural information processing systems. 2013;26:9 pages.

Song et al., Intention-aware autonomous driving decision-making in an uncontrolled intersection. Mathematical Problems in Engineering. Mar. 2016;2016:16 pages.

Sonu et al., Exploiting hierarchy for scalable decision making in autonomous driving. 2018 IEEE Intelligent Vehicles Symposium (IV) Jun. 26, 2018:6 pages.

Sutton et al., Reinforcement learning: An introduction. MIT press; Nov. 13, 2018:548 pages.

Talpaert et al., Exploring applications of deep reinforcement learning for real-world autonomous driving systems. arXiv preprint arXiv:1901.01536. Jan. 16, 2019:9 pages.

Treiber et al., Congested Traffic States in Empirical Observations and Microscopic Simulations. arXiv preprint cond-mat/0002177. Aug. 30, 2000:47 pages.

Völz et al., Inferring pedestrian motions at urban crosswalks. IEEE Transactions on Intelligent Transportation Systems. May 11, 2018;20(2):12 pages.

Wächter et al., On the Implementation of an Interior-Point Filter Line-Search Algorithm for Large-Scale Nonlinear Programming. 2004:28 pages.

Watkins et al., Q-learning. Machine learning, vol. Mar. 1992;8:55-68.

Wei et al., Autonomous vehicle social behavior for highway entrance ramp management. 2013 IEEE Intelligent Vehicles Symposium (IV) Jun. 23, 2013:201-7.

Wulfmeier et al., Maximum entropy deep inverse reinforcement learning. arXiv preprint arXiv:1507.04888. Mar. 11, 2016:10 pages.

Wulfmeier et al., Watch This: Scalable Cost-Function Learning for Path Planning in Urban Environments. arXiv preprint arXiv:1607.02329. Jul. 8, 2016:8 pages.

Xu et al., Learning trajectory prediction with continuous inverse optimal control via Langevin sampling of energy-based models. arXiv preprint arXiv:1904.05453. Apr. 10, 2019:9 pages.

Zhou et al., Joint Multi-Policy Behavior Estimation and Receding-Horizon Trajectory Planning for Automated Urban Driving. 2018:7 pages.

Z1ebart et al., Maximum entropy inverse reinforcement learning. AAAI Jul. 13, 2008:1433-38.

PCT/EP2019/078072, May 13, 2020, International Search Report and Written Opinion.

Office Action issued in European Patent Application No. 19801204.9, dated Jun. 16, 2023 (6 pages).

Schulz Jens et al., "Estimation of Collective Maneuvers through Cooperative Multi-Agent Planning," 2017 IEEE Intelligent Vehicles Symposium, Jun. 11, 2017, pp. 624-631.

Translation of Office Action issued in Japanese Patent Application No. 2021-546461, dated Mar. 24, 2023 (6 pages).

Office Action in Japanese Application No. 2021-546461, dated Sep. 22, 2023 (8 pages).

\* cited by examiner

Available manoeuvres in first encountered scenario (joining roundabout):

Expected trajectories of external actors modelled:

Simulated sequence of manoeuvres: slow down, then follow lane; penalized for lack of progress.

Simulated sequence of manoeuvres: switch right, then follow lane; relatively high reward:

Simulated sequence: follow lane for extended interval; penalized as unsafe (predicted collision/near collision with external vehicle):

Many attempts converge towards optimal, and AV eventually selects and executes sequence of manoeuvres:

Process repeats to determine optimal manoeuvre sequence to exit roundabout at defined exit:

Gaussian process fitted to driving trajectories obtained from CCTC.

AUTONOMOUS VEHICLE PLANNING

RELATED APPLICATIONS

This Application is a national stage filing under 35 U.S.C. 371 of International Patent Application Serial No. PCT/EP2019/078072, filed Oct. 16, 2019, which claims priority to United Kingdom patent application number GB 1816852.6, filed Oct. 16, 2018, to United Kingdom patent application number GB 1816850.0, filed Oct. 16, 2018, and to United Kingdom patent application number GB 1816853.4, filed Oct. 16, 2018. Each of the foregoing applications is incorporated by reference herein in its entirety.

TECHNICAL FIELD

This disclosure relates to autonomous vehicle (AV) manoeuvre planning.

BACKGROUND

An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver.

SUMMARY

In order to navigate an encountered driving scenario safely and effectively, an autonomous vehicle planner needs to be able to plan a sequence of manoeuvres to be executed in the encountered scenario. The invention provides a reasoning framework that allows a computer-implemented AV planner to reason about the possible effect of different sequences of manoeuvres in a driving scenario it has encountered, taking into account the anticipated behaviour of other vehicles/agents, so that it may determine a suitable sequence of manoeuvres (ego vehicle maneuvers) to be executed in that scenario.

Aspects of the present invention relate to an autonomous vehicle (AV) planning method comprising:
  receiving sensor signals (inputs) pertaining to an AV;
  processing the sensor inputs to determine an encountered driving scenario;
  in an AV planner, executing a tree search algorithm to determine a sequence of AV manoeuvres corresponding to a path through a constructed game tree; and
  generating AV control signals for executing the determined sequence of AV manoeuvres;
  wherein the game tree has a plurality of nodes representing anticipated states of the encountered driving scenario, and the anticipated driving scenario state of each child node is determined by updating the driving scenario state of its parent node based on (i) a candidate AV manoeuvre and (ii) an anticipated behaviour of at least one external agent (actor) in the encountered driving scenario.

The anticipated behaviour of the external agent is simulated by applying a generative behaviour model to one or more observed parameters of the external agent as derived from the sensor signals.

The generative behaviour model may also be applied to one or more ego vehicle parameters (to model the other actor's response to an ego vehicle implementing or otherwise being controlled by the planning method) and/or one or more parameters of the driving scenario (such as road layout/other driving environment parameters to model the other actor's response to its environment).

In a first aspect of the invention, the generative behaviour model is a machine learning (ML) model which has been trained based on examples of observed, real-world driving behaviour.

That is, the first aspect provides an autonomous vehicle (AV) planning method comprising:
  receiving sensor inputs pertaining to an AV;
  processing the AV sensor inputs to determine an encountered driving scenario;
  in an AV planner, executing a tree search algorithm to determine a sequence of AV manoeuvres corresponding to a path through a constructed game tree; and
  generating AV control signals for executing the determined sequence of AV manoeuvres;
  wherein the game tree has a plurality of nodes representing anticipated states of the encountered driving scenario, and the anticipated driving scenario state of each child node is determined by updating the driving scenario state of its parent node based on (i) a candidate AV manoeuvre and (ii) an anticipated behaviour of at least one external agent in the encountered driving scenario; and
  wherein the anticipated behaviour of the external agent is simulated by applying a generative behaviour model to one or more observed parameters of the external agent as derived from the sensor inputs, the generative behaviour model being a machine learning (ML) model which has been trained based on examples of observed, real-world driving behaviour.

In embodiments, object tracking may be applied to the sensor inputs to determine an observed trace of the external agent, and the anticipated behaviour of the external agent may be simulated based on the observed trace.

At least some of the examples of observed, real-world driving behaviour used to train the generative model may have been extracted from closed circuit television data.

The generative behaviour model may comprise a trained neural network.

The anticipated behaviour of the external agent may be simulated using learned occupancy and/or transition probabilities of a spatial Markov model learned for a driving area of the encountered driving scenario.

The tree search algorithm may be a probabilistic tree search algorithm.

The tree search algorithm may be a Monte Carlo Tree Search (MCTS) algorithm.

The driving scenario may be determined by extracting from the sensor inputs a set of driving scenario parameters in accordance with a defined scenario description language.

The generative behaviour model is also be applied to one or more ego vehicle parameters and/or one or more parameters of the driving scenario.

In a second aspect of the invention, the generative behaviour model takes the form of an inverse planner which applies an inverse planning method to the one or more observed parameters to simulate the anticipated behaviour.

That is, the second aspect provides an autonomous vehicle (AV) planning method comprising:
receiving sensor inputs pertaining to an AV;
processing the sensor inputs to determine an encountered driving scenario;
in an AV planner, executing a tree search algorithm to determine a sequence of AV manoeuvres corresponding to a path through a constructed game tree; and
generating AV control signals for executing the determined sequence of AV manoeuvres;
wherein the game tree has a plurality of nodes representing anticipated states of the encountered driving scenario, and the anticipated driving scenario state of each child node is determined by updating the driving scenario state of its parent node based on (i) a candidate AV manoeuvre and (ii) an anticipated behaviour of at least one external agent in the encountered driving scenario; and
wherein the anticipated behaviour of the external agent is simulated by applying an inverse planning method to one or more observed parameters of the external actor as derived from the sensor inputs.

The inverse planning method may comprise determining a set of available goals for the external actor in the encountered driving scenario, and applying probabilistic or deterministic goal recognition in respect of the set of available goals, in order to simulate the anticipated behaviour. Deterministic goal recognition means identifying one of the available goals as being implemented by the external actor. Probabilistic goal recognition means estimating for at least one of the available goals a probability that the external agent is implementing that goal (e.g. a probability for each goal which is the probability that the external actor is implementing that goal).

Object tracking may be applied to the sensor inputs, in order track at least one external actor in the encountered driving scenario, and thereby determine an observed trace of the external actor over a time interval.

The inverse planning method may comprise:
determining a set of available goals for the external actor in the encountered driving scenario,
for each of the available goals, determining an expected trajectory model,
comparing the observed trace of the external actor with the expected trajectory model for each of the available goals, to determine a likelihood of that goal, and
using the determined likelihood of at least one of the goals to simulate the anticipated behaviour of the external actor.

The step of using the determined likelihood of the at least one goal to simulate the anticipated behaviour of the external actor may comprise computing at least one predicted trajectory for the external actor based on the expected trajectory model for the at least one goal and the determined likelihood of that goal.

The expected trajectory model for each goal may be a distribution of predicted trajectories associated with that goal.

The distribution for each goal $G_i$ may comprise a conditional probability $p(T|G_i)$ for each predicted trajectory T in a set of predicted trajectories and the likelihood of that goal $p(G_i|\tau)$ is used to estimate at least one predicted trajectory probability $p(T|\tau)$ given the observed trace T.

The observed trace may be used to predict a best-available trajectory model for the goal, said comparison comprising comparing the best-available trajectory model with the expected trajectory model.

The observed trace may be used to predict a current maneuver and/or a future maneuver of the external actor, and the predicted current or future maneuver may be used to determine the best-available trajectory model.

A sequence of multiple maneuvers may be determined for at least one goal, and the best-available trajectory model may be determined for that goal based on partial trajectory models respectively associated with the multiple maneuvers.

Each partial trajectory model may comprise one or more target motion values, and one or more motion values of a future portion of the best-available trajectory model may be determined by applying motion smoothing to the target motion values.

The expected trajectory model for each goal may be a single expected trajectory for that goal.

The best-available trajectory model for each goal may be a single best-available trajectory.

The partial trajectory model for each maneuver may be a most-likely partial trajectory for that maneuver.

A defined cost function may be applied to both the expected trajectory model and the best-available trajectory model for each goal, to determine respective costs of those trajectory models, wherein said comparison comprises comparing those costs.

The cost function may reward reduced driving time whilst penalizing unsafe trajectories.

The cost function may also penalize lack of comfort.

The anticipated behaviour of the external agent may be simulated by sampling a goal from the set of available goals based the determined likelihoods of the goals.

Different goal distributions may be determined for different maneuvers or maneuver sequences, and the anticipated behaviour of the external agent may be simulated by sampling a maneuver or maneuver sequence from a set of possible maneuvers based on the maneuver distribution, and then sampling the goal from the set of available goals based on the goal distribution determined for that maneuver or maneuver sequence.

The maneuver distribution may be determined using inverse planning at the maneuver level, which may comprise: for each of the possible maneuvers, determining an expected trajectory model, and comparing the observed trace of the external actor with the expected trajectory model for each of the possible maneuvers, to determine a likelihood of that maneuver.

The search algorithm may be performed multiple times for multiple constructed game trees with different sampled goals, and the sequence of AV maneuvers may be determined by the AV planner based on a statistical analysis of paths within the multiple constructed game trees.

Object tracking may be applied to the sensor inputs, in order track at least one external actor in the encountered driving scenario, and thereby determine an observed trace of the external actor over a time interval;
wherein the inverse planning method may comprise:
determining a set of possible maneuvers for the external actor in the encountered driving scenario,
for each of the possible maneuvers, determining an expected trajectory model,
comparing the observed trace of the external actor with the expected trajectory model for each of the possible maneuvers, to determine a likelihood of that maneuver, and using the determined likelihood of at least one of the maneuvers to simulate the anticipated behaviour of the external actor.

The expected trajectory model for each maneuver may be a single trajectory associated with that maneuver.

The expected trajectory model for each maneuver may be a distribution of predicted trajectories associated with that maneuver.

A third aspect of the invention provides an autonomous vehicle (AV) planning method comprising:
  receiving sensor inputs pertaining to an AV;
  processing the sensor inputs to determine an encountered driving scenario;
  in an AV planner, executing a tree search algorithm to determine a sequence of AV manoeuvres corresponding to a path through a constructed game tree; and
  generating AV control signals for executing the determined sequence of AV manoeuvres;
  wherein the game tree has a plurality of nodes representing anticipated states of the encountered driving scenario, and the anticipated driving scenario state of each child node is determined by updating the driving scenario state of its parent node based on (i) a candidate AV manoeuvre and (ii) an anticipated behaviour of at least one external agent in the encountered driving scenario; and
  wherein the anticipated behaviour of the external agent is simulated by applying goal recognition to one or more observed parameters of the external actor as derived from the sensor inputs.

The goal recognition may comprise computing, for each goal of a set of available goals:
  a best-available trajectory model for the goal based on the one or more observed parameters, and
  an optimal trajectory model for the goal.

The goal recognition may be probabilistic, and a goal distribution may be determined by comparing the best-available trajectory model with the optimal trajectory model for each goal.

A defined cost function may be applied to both the expected trajectory model and the best-available trajectory model for each goal, to determine respective costs of those trajectory model, and those trajectory models may be compared by comparing their costs.

Multiple goal distributions may be determined for multiple possible maneuvers or maneuver sequences.

The anticipated behaviour may be simulated based on a goal sampled from the set of available goals based on the goal distribution.

The anticipated behaviour may be simulated by sampling at least one maneuver from the possible maneuvers based on a maneuver distribution determined for the external agent, and then sampling the goal from the goal distribution determined for the sampled maneuver.

The tree search algorithm may be performed multiple times for multiple constructed game trees with different sampled goals, and the sequence of AV maneuvers may be determined by the AV planner based on a statistical analysis of paths within the multiple constructed game trees.

The goal recognition may alternatively be performed using a goal recognition decision tree.

Another aspect of the invention provides a method of configuring an autonomous vehicle, the method comprising:
  receiving, at a training system, real-world driving behaviour data captured from one or more driving areas;
  processing the real-world driving behaviour to extract examples of real-world driving behaviour for use in training a generative model;
  using the extracted driving behaviour examples to train a generative behaviour model to predict the behaviour of an external agent based on one or more observed parameters of the external agent; and
  storing the trained generative behaviour model in electronic storage of an autonomous vehicle, wherein the autonomous vehicle comprises an autonomous vehicle planner configured to implement the method of any aspect disclosed herein or any embodiment thereof using that generative behaviour model.

The sensor inputs referred to above may comprise sensor inputs received from an AV sensor system. Further or alternatively, the sensor inputs may comprise externally-captured sensor inputs received via a communications link.

Another aspect of the invention provides an autonomous vehicle (AV) planning method comprising:
  receiving sensor inputs pertaining to an AV;
  processing the AV sensor inputs to determine an encountered driving scenario;
  in an AV planner, executing a tree search algorithm to determine a sequence of AV manoeuvres corresponding to a path through a constructed game tree; and
  generating AV control signals for executing the determined sequence of AV manoeuvres;
  wherein the game tree has a plurality of nodes representing anticipated states of the encountered driving scenario, and the anticipated driving scenario state of each child node is determined by updating the driving scenario state of its parent node based on (i) a candidate AV manoeuvre and (ii) an anticipated behaviour of at least one external agent in the encountered driving scenario.

Any of the above features may be implemented in embodiments thereof.

Further aspects of the invention provide a computer system comprising execution hardware configured to execute any of the method steps disclosed herein, and a computer program comprising executable instructions configured, when executed, to implement any of the method steps.

Yet further aspects provide an autonomous vehicle (AV) planner embodied in a computer system configured to implement any of the method steps disclosed herein and an autonomous vehicle comprising the autonomous vehicle planner and a drive mechanism coupled to the autonomous vehicle planner and responsive to control signals generated by the AV planner.

BRIEF DESCRIPTION OF FIGURES

For a better understanding of the present invention, and to show how embodiments of the same may be carried into effect, reference is made to the following figures in which.

DETAILED DESCRIPTION

Example embodiments of the present invention are described in detail below. First some useful context to the invention is described.

Figure 1:
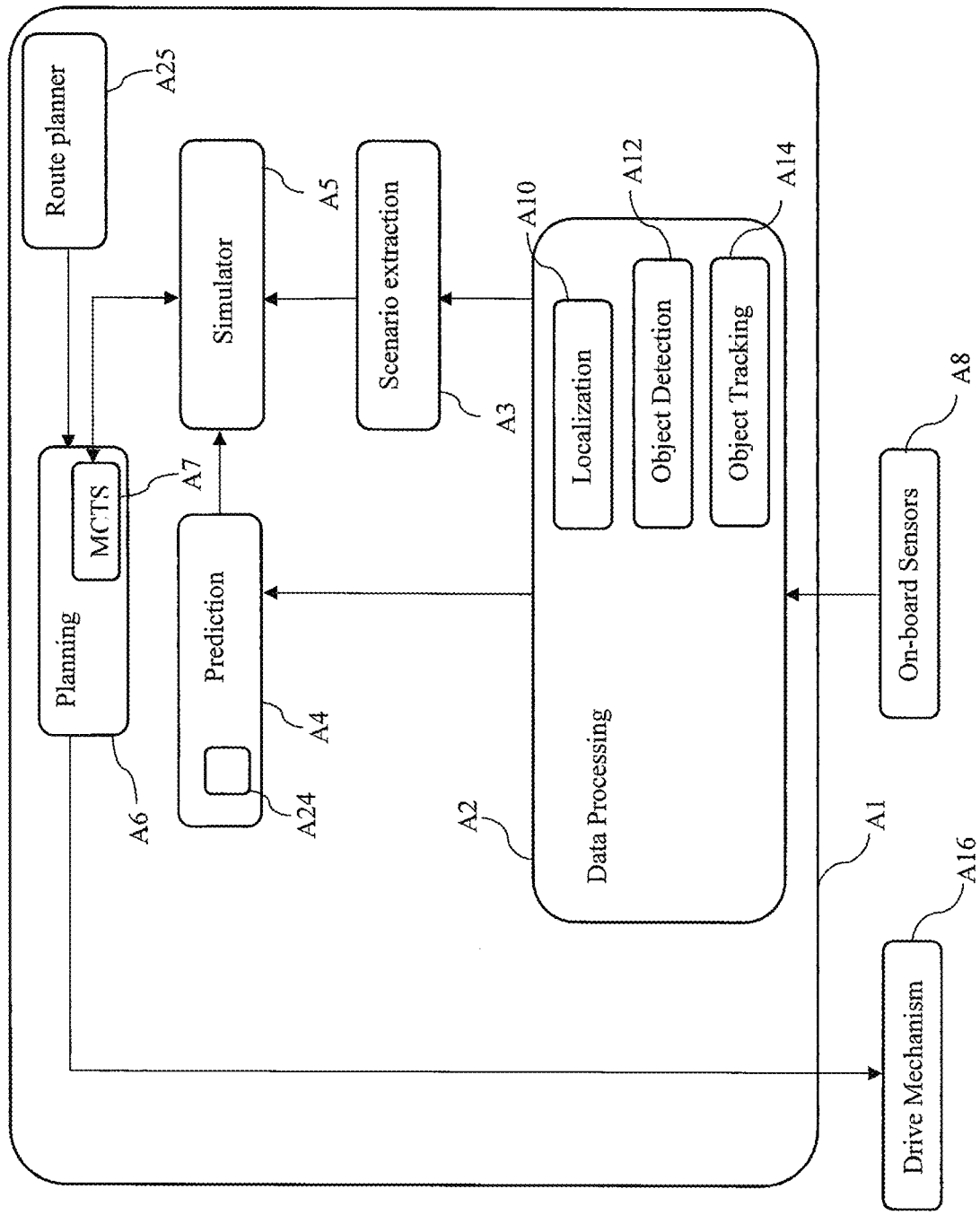
FIG. 1 shows a schematic functional block diagram showing functional components implemented in an autonomous vehicle computer system.

FIG. 1 shows a highly schematic functional block diagram of certain functional components embodied in an on-board computer system A1 of an AV (ego vehicle), namely a data processing component A2, a prediction component A4 and an AV planner A6.

The data processing component A2 receives sensor data from an on-board sensor system A8 of the AV. The on-board sensor system A8 can take different forms but generally comprises a variety of sensors such as image capture devices (cameras), LiDAR units etc., satellite-positioning sensor(s) (GPS etc.), motion sensor(s) (accelerometers, gyroscopes etc.) etc., which collectively provide rich sensor data from which it is possible to extract detailed information about the surrounding environment and the state of the AV and other actors (vehicles, pedestrians etc.) within that environment.

Note however that the present techniques are not limited to using image data and the like captured using on-board optical sensors (image capture devices, lidar etc.) of the AV itself. The method can alternatively or additionally be applied using externally-captured sensor data, for example CCTV images etc. captured by external image capture units in the vicinity of the AV. In that case, at least some of the sensor inputs used to implement the method may be received by the AV from external sensor data sources via one or more wireless communication links.

The data processing system A2 processes the sensor data in order to extract such information therefrom. This will generally involve various forms of machine learning (ML)/artificial intelligence (AI) processing. Functions of the data processing system A2 that are relevant in the present context include localization (block A10), object detection (block A12) and object tracking (block A14).

Localization is performed to provide awareness of the surrounding environment and the AV's location within it. A variety of localization techniques may be used to this end, including visual and map-based localization. By way of example, reference is made to United Kingdom patent Application No. 1812658.1 entitled "Vehicle Localization", which is incorporated herein by reference in its entirety. This discloses a suitable localization method that uses a combination of visual detection and predetermined map data. Segmentation is applied to visual (image) data to detect surrounding road structure, which in turn is matched to predetermined map data, such as a HD (high-definition) map, in order to determine an accurate and robust estimate of the AV's location, in a map frame of reference, in relation to road and/or other structure of the surrounding environment, which in turn is determined through a combination of visual detection and map-based inference by merging visual and map data. To determine the location estimate, an individual location estimate as determined from the structure matching is combined with other location estimate(s) (such as GPS) using particle filtering or similar, to provide an accurate location estimate for the AV in the map frame of reference that is robust to fluctuations in the accuracy of the individual location estimates. Having accurately determined the AV's location on the map, the visually-detected road structure is merged with the predetermined map data to provide a comprehensive representation of the vehicle's current and historical surrounding environment in the form of a live map and an accurate and robust estimate of the AV's location in the map frame of reference. The term "map data" in the present context includes map data of a live map as derived by merging visual (or other sensor-based) detection with predetermined map data, but also includes predetermined map data or map data derived from visual/sensor detection alone.

Object detection is applied to the sensor data to detect and localize external objects within the environment such as vehicles, pedestrians and other external actors whose behaviour the AV needs to be able to respond to safely. This may for example comprise a form of 3D bounding box detection, wherein a location, orientation and size of objects within the environment and/or relative to the ego vehicle is estimated. This can for example be applied to (3D) image data such as RGBD (red green blue depth), LiDAR point cloud etc. This allows the location and other physical properties of such external actors to be determined on the map.

Object tracking is used to track any movement of detected objects within the environment. The result is an observed trace ($\tau$) of each object that is determined over time by way of the object tracking. The observed trace $\tau$ is a history of the moving object, which captures the path of the moving object over time, and may also capture other information such as the object's historic speed, acceleration etc. at different points in time.

Used in conjunction, object detection and object tracking allow external actors to be located and tracked comprehensively on the determined map of the AV's surroundings.

Object detection and object tracking are well-known per-se, and can be performed in the present context using various publicly available state-of-the-art models.

Through the combination of localization, object detection and object tracking, the data processing component A2 provides a comprehensive representation of the ego vehicle's surrounding environment, the current state of any external actors within that environment (location, heading, speed etc. to the extent they are detectable), as well as the historical traces of such actors which the AV has been able to track. This is continuously updated in real-time to provide up-to-date location and environment awareness.

The prediction component A4 uses this information as a basis for a predictive analysis, in which it makes predictions about future behaviour of the external actors in the vicinity of the AV. Examples of suitable prediction methodologies are described below.

The AV planner A6 uses the extracted information about the ego's surrounding environment and the external agents within it, together with the behaviour predictions provided by the prediction component A4, as a basis for AV planning. That is to say, the predictive analysis by the prediction component A4 adds a layer of predicted information on top of the information that has been extracted from the sensor data by the data processing component, which in turn is used by the AV planner A6 as a basis for AV planning decisions. This is generally part of hierarchical planning process, in which the AV planner A6 makes various high-level decisions and then increasingly lower-level decisions that are needed to implement the higher-level decisions. The end result is a series of real-time, low level action decisions. In order to implement those decisions, the AV planner A6 generates control signals, which are input, at least in part, to a drive mechanism A16 of the AV, in order to control the speed and heading of the vehicle (e.g. though steering, breaking, accelerating, changing gear) etc. Control signals are also generated to execute secondary actions such as signalling.

A scenario extraction component A3 determines an encountered driving scenario for the ego vehicle using outputs of the data processing component A2. The determined driving scenario comprises driving scenario parameters which are extracted from the captured sensor data, and which provide a representation of a real-world scenario that has been encountered by the AV that is concise but sufficiently detailed to be used as a basis for realistic simulations. This is formulated in a structured scenario description language which can be used as a basis for such simulations. An example of a scenario description in a formal scenario description language is provided in Annex A.

A simulator A5 receives the parameters of the encountered driving scenario and can run simulations based on those parameters. These are simulations of what might happen in the encountered driving scenario under different assumptions. These simulations are used as a basis for AV planning, in which the AV planner A6 runs multiple simulations with the aim of determining a globally optimal sequence of manoeuvres to be taken in the encountered driving scenario to execute a defined goal (i.e. achieve a desired outcome, such as reaching a particular location on the map). In the examples described below, the simulations are runs as part of a Monte Carlo Tree Search (MCTS) executed by a manoeuvre selection component A7 of the AV planner A6.

A function of the prediction component A4 is to model predicted external agent behaviours to be run as part of the simulations. That is, to execute an external agent behaviour model for predicting the behaviour of any external actors in the encountered driving scenario so that the predicted behaviour can be incorporated into the simulations on which manoeuvre planning is based.

Manoeuvre Planning

When the ego vehicle is travelling, it must plan which manoeuvres to perform in order to execute a defined goal. As indicated, this may be achieved using a Monte Carlo Tree Search, which is a heuristic search algorithm for decision processes. The Monte Carlo Tree Search is an "online" reasoning process, i.e. which is performed by the AV planner A6 in order to take actual driving decisions in real-time.

The MCTS is applied to a game tree. A game tree is a data structure originating from game theory, which provides a framework for rational decision making via a systematic analysis of different possible outcomes that are capable of being meaningfully scored. A fully-constructed game tree captures every possible outcome of a "game" with a finite number of possible "moves", where the term game is used in the mathematical sense to mean a formal model of strategic interactions (moves) between decision-making agents. A tree search algorithm can be applied to a game tree with the objective of determining a sequence of moves—corresponding to a particular path through the game tree—that is (globally) optimal with respect to a defined reward (score) function.

MCTS is an efficient probabilistic tree search algorithm for searching a game tree. The game tree is constructed dynamically as different paths are explored. A benefit of MCTS is that it can provide an asymptotically correct approximation without requiring every possible path through the game tree to be full explored, i.e. not every possible sequence of moves needs to be considered, which in turn means that the game tree need not be fully constructed. In that event, MCTS does not guarantee that the true globally optimal sequence of moves will be found, but the algorithm will converge towards a sufficiently optimized solution given a reasonable amount of time and computational resources.

Note that, in the present context, there may be variations on a discrete set of ordered manoeuvres that are treated as unique sequences for the present purpose. For example, "follow lane" between time t0 and t1 and "switch lane" between t1 and t2 may be considered a different sequence of manoeuvres to "follow lane" between time t0 and t1' (different from t1) and switch lane between t1' and t2, because the change from follow lane to switch lane occurs at different respective times.

In the present context, the moves are driving manoeuvres. When the ego vehicle encounters an actual driving scenario it needs to navigate, MCTS is applied as a means of reasoning systematically about the different possible outcomes of different ego manoeuvres (i.e. manoeuvres which the AV planner A6 of the ego vehicle might take) in the encountered driving scenario, taking into account the predicted behaviour of any external agents (other vehicles, pedestrians etc.) therein. This is achieved by parameterising the encountered driving scenario based on the captured sensor data as above and running different simulations in the simulator A5 based on the extracted driving scenario parameters and the external agent behaviour as modelled by the prediction component A4.

The use of a probabilistic tree search algorithm such as MCTS allows a sufficiently-optimal sequence of manoeuvres to be found for even large game trees as part of real-time AV decision making. In the present context, the game tree may be large because there may be many agents in the scenario.

The results of those simulations are used to evaluate the defined reward function for the purpose of scoring different possible paths through the game tree, which in turn drives the execution of the MCTS towards a globally optimal path with respect to the reward function.

Figure 2:
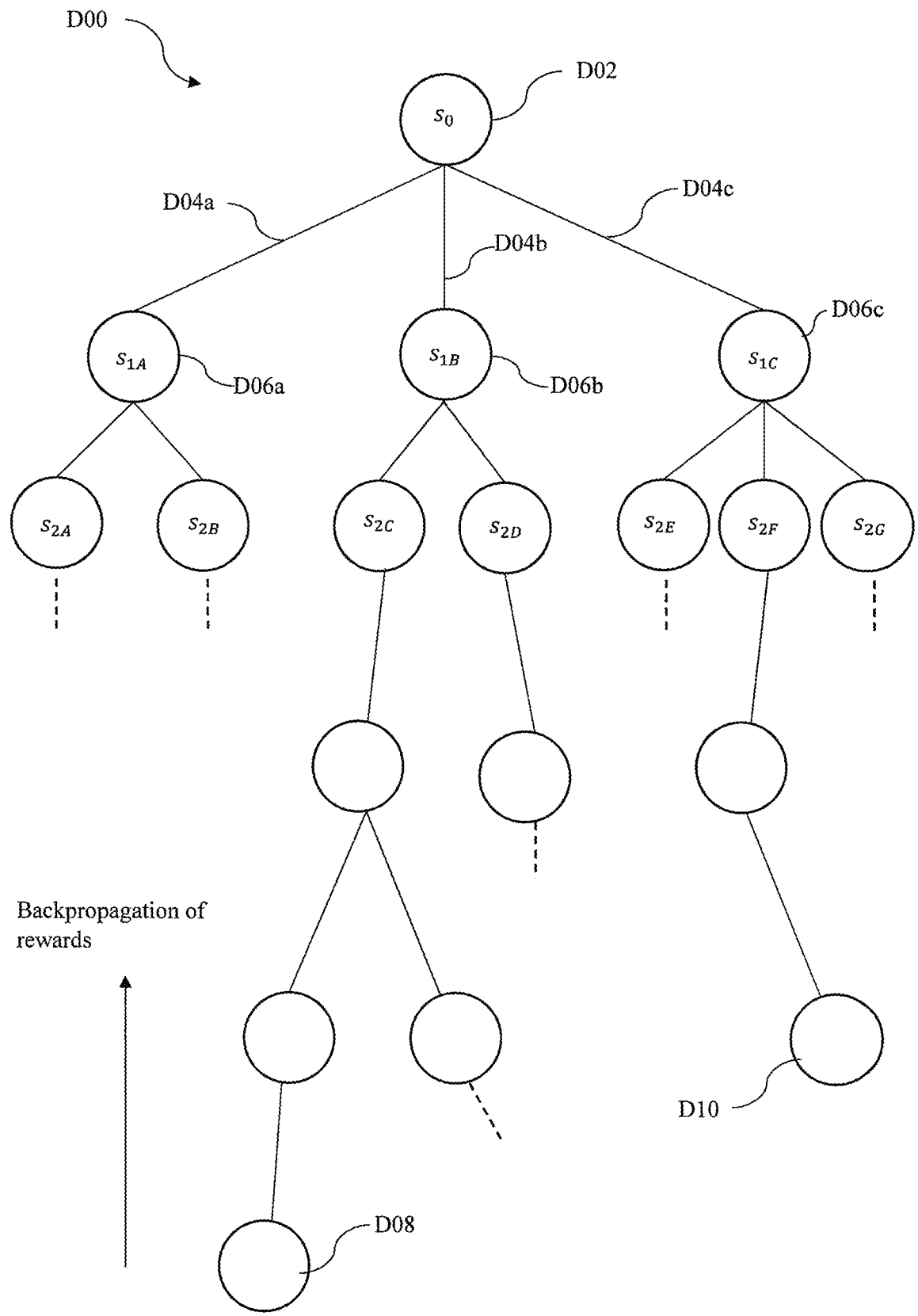
FIG. 2 shows an example game tree that may be used for autonomous vehicle manoeuvre planning.

An example game tree D00 is shown in FIG. 2.

The game tree D00 has a root node D02 representing a current state $s_0$ of the encountered driving scenario (defined as time t=0 for convenience). This captures the actual current state of the ego vehicle and the current state of any external agents (location, speed, acceleration, etc.) within the encountered driving scenario, relative to their surroundings, and in particular relative to a surrounding road layout/structure.

Additional nodes of the MCT D00 represent anticipated (i.e. predicted, future) states of the driving scenario under different assumptions about the ego vehicle's behaviour, at different times in the future. The structure of the MCT D00 allows the AV planner A6 to reason about what might happen in the driving scenario if the ego vehicle were to perform given sequences of manoeuvres.

In order to facilitate such reasoning, the MCT D00 is structured as follows.

Possible manoeuvres are represented by edges of the Monte Carlo Tree D00. Possible manoeuvres for the ego vehicle are hypothesised given its current state $s_0$ and the defined goal to be executed.

Each node other than the root node D02 is a child of another node (its parent), and represents an anticipated state of the driving scenario. The anticipated state is determined for each such node based on a simulation of the encountered driving scenario that is run in the simulator A5 under a certain set of relevant assumptions, as will now be described.

An edge is shown from each parent node to its respective child or children nodes. The edge between each parent-child node pair represents a corresponding manoeuvre that the AV planner A6 could take given the state of the driving scenario represented by the parent node (at time t); the child node, in turn, represents the anticipated state of the driving scenario (at time t+Δt) in the event that this manoeuvre is performed over the interval Δt.

The anticipated driving scenario state of each child node is determined by updating the driving scenario state represented by its parent node based on an appropriate simulation of the driving scenario. The driving scenario simulation is run based on the following: the extracted driving scenario description parameters; the parent state (this may for example be used as a starting state for the simulation); the corresponding manoeuvre between the parent and child nodes (the performance of which is simulated between time t and t+Δt); and simulated external agent behaviour between time t and t+Δt (as modelled by the prediction component A4).

The performance of the corresponding manoeuvre by the ego vehicle in the interval ΔT is simulated by simulating or "rolling out" actions that the AV planner A6 would take in real-life given the state of the driving scenario represented by the parent node, the external agent behaviour in that time interval Δt, and the manoeuvre to be performed.

The performance of the manoeuvre by the ego vehicle can be simulated using an "action policy" that has been learned or otherwise determined for performing the manoeuvre in question given a particular state. The action policy is also used by the AV planner A6 as a basis for performing that manoeuvre in the real-world. An action policy can be learnt "offline" through reinforcement learning (RL), for example. By way of example, reference is made to United Kingdom Patent Application No. 1816852.6 entitled "Autonomous Vehicle Manoeuvres", which is incorporated herein by reference in its entirety. This discloses a Framework for manoeuvre learning in which training scenarios are determined from observed driving behaviour data.

As indicated, the external agent behaviour is simulated by executing an external agent behaviour model of the prediction component A4. Examples of suitable behaviour simulation models are described later.

By way of example, FIG. 2 shows edges D04a-c from the root node D02 to three direct child nodes of the root node, labelled D06a-c respectively. Each of those edges D04a-c represents a different manoeuvre that may be performed given the state $s_0$ of the driving scenario of the node from which they extend (the root node D02 in this instance). Each of those children represents a subsequent state of the driving scenario—$s_{1A}$, $s_{1B}$, $s_{1C}$ respectively—that is predicted in the event that the corresponding manoeuvre is performed by the ego vehicle, starting from state $s_0$.

For example, the edges D04a-c may correspond respectively to "follow lane", "switch lane left", and "switch lane right" in a multi-lane driving scenario with respect to the parent state $s_0$. In the state $s_0$, the ego vehicle is in a current lane—the follow lane manoeuvre is performed to stay in the current lane over the applicable time interval Δt; switch lane left and right are performed to attempt a move to a lane to the left and right of the current lane respectively. The states $s_{1A}$, $s_{1B}$, $s_{1C}$ are obtained by progressing the parent state $s_0$ in accordance with the relevant manoeuvre, taking into account the external agent behaviour over the relevant time interval.

Other example manoeuvres that might be applicable include slow down, continue and exit (e.g. when navigating a roundabout).

As will be appreciated, the driving scenario states of nodes further down the tree are obtained in exactly the same way, starting from their respective parent states.

Certain nodes are terminating (terminal) nodes, i.e. nodes which have no children, such as nodes D08 and D10 in FIG. 2. These represent "end-states"—which, in broad terms, correspond to either to a point at which the ego vehicle has successfully executed the defined goal (success), or a point at which the defined goal is determined to have failed. Failure can be defined in various ways depending on the circumstances, but examples include: the ego vehicle being forced to abort the goal; the vehicle being determined to have made insufficient progress; and the vehicle crashing or otherwise failing for safety reasons. Depending on the circumstances, starting from the root node D02, a manoeuvre or a sequence of manoeuvres may be required to reach a terminating node.

Optionally, an end goal may be broken down into two or more intermediate goals, which may be appropriate when the end goal is too far away. In this context, each intermediate goal may be executed based on its own game tree, which has terminating nodes representing end-states of the intermediate goal (but which are not necessarily end-states of the end-goal).

The game tree D00 is a finite tree in that every possible path through the game tree D00 eventually terminates at a terminating node after a finite number of moves.

Each considered terminating node is assigned a score (reward) based on a reward function, that indicates a desirability of the outcome it represents. This could be a simple binary scheme, with two scores for success and failure respectively, or a richer scoring mechanism can be applied as appropriate. For example, successful outcomes may be scored more highly if they are reached in a shorter amount of time or are otherwise more desirable on whatever criteria are appropriate in the circumstances. The score assigned to each possible path through the game tree is simply the score assigned to its terminating node.

Rewards are not necessarily only given in terminal states. Each considered path is assigned a score (reward) based on a reward function, that indicates a desirability of the outcome it represents. This could be a simple binary scheme, with two scores for success and failure respectively, or a richer scoring mechanism can be applied as appropriate. For example, successful outcomes may be scored more highly if they are reached in a shorter amount of time or are otherwise more desirable on whatever criteria are appropriate in the circumstances.

In the present example, the game is a single-player model in that each edge corresponds to a manoeuvre by the ego vehicle. The behaviour of external agents is captured as part of the state changes that occur in moving from the applicable parent node to the applicable child node. Whilst the method does roll out what the other agents might do, it does not necessarily incorporate, in that roll out, how the other agents might respond to the hypothesised action for the ego vehicle (but neither is that excluded). That is, whilst the generate behaviour may model a response of the external actor to the ego vehicle, as well as to its surroundings (driving context, e.g. road layout), it is not a requirement to model high-level decision making by the external actor as acceptable results can be achieved with a simpler model. However, the present techniques can be extended to incorporate a model of high-level planning by the external actor (such as inverse planning).

Only possible (i.e. realistically achievable) manoeuvres may be hypothesised. For example, if the vehicle is at a particular location relative to a T-junction (corresponding to the parent state), there may be three possible manoeuvres, to stop, turn left, and turn right, but continuing straight would not be an option.

As another example, in a multi-lane road the available manoeuvres may be follow lane and switch lane. MCTS is used to sequence those manoeuvres so that the vehicle maintains the follow lane manoeuvre until it is safe to begin a switch lane manoeuvre.

The model can incorporate a level of understanding as to how vehicles can behave in the real-world. For example, it knows that one limitation of a vehicle is that is cannot turn on the spot. Therefore, any manoeuvres which would require impossible vehicle behaviours are not hypothesised.

One way to identify the optimal path through the game tree D00 would be to evaluate the score for every possible terminating node, and select a path with the highest score. However, in practice, this may not be feasible, especially in real-time.

In such circumstances, a probabilistic tree search such as MCTS can be used which is able to find a path that is at least sufficiently close to optimal, in a reasonable amount of time using a reasonable amount of compute resources.

Figure 8:
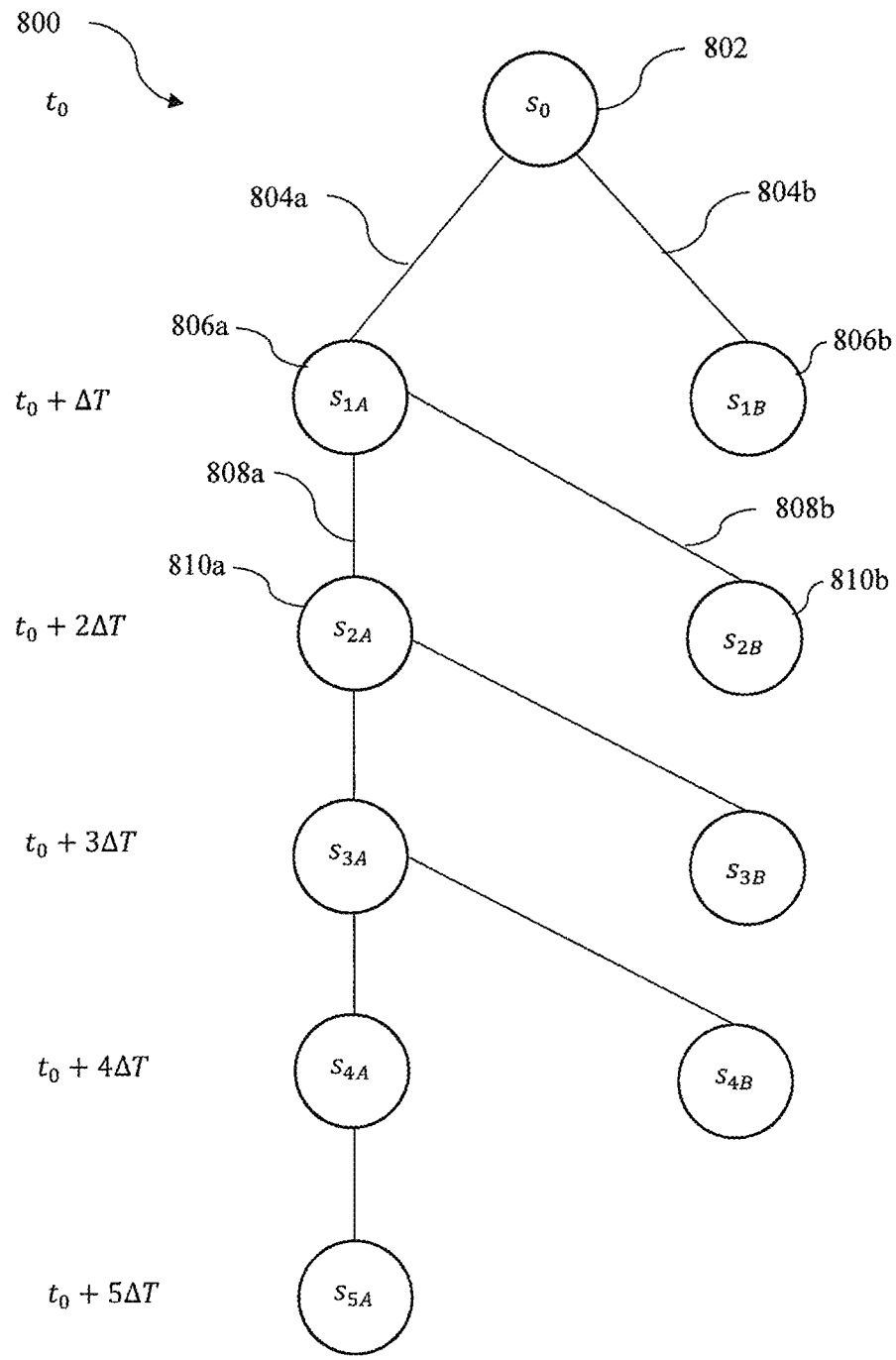
FIG. 8 shows an example of a tree search based on two possible manoeuvres.

FIG. 8 shows a simple example of an MCT 800 which may be used when there are only two possible manoeuvres for the given goal. For example, the goal may be to join the traffic flow in a particular direction from a side road. In this example, the AV needs to turn left to join the road. If both roads are single lane, the two possible manoeuvres the AV can implement are to stop or to turn left. This gives rise to multiple possible manoeuvre sequences depending on when the vehicle changes from "stop" to turn left—e.g. (stop, stop, turn, turn, . . . ) versus (stop, stop, stop, turn, . . . ) etc.

The current state $s_0$ of the AV is the state when the AV is approaching the junction. This is represented by the root node 802 at time $t_0$. The AV may either stop at the junction or turn left onto the road. These two possible manoeuvres are represented by edges 804a and 804b respectively.

In order to achieve the goal of joining the main road, the AV must implement the manoeuvre of turning left, edge 804b. However, this may be implemented at any time. The MCT 800 shows the predicted states of the AV after each of 5 time intervals $\Delta t$, although it will be appreciated that more or fewer time intervals may be considered. Although the time intervals at which the states are determined are shown to be the same in the MCT of FIG. 8, it will be appreciated that the time intervals of each iteration may vary.

The AV starts in state $s_0$. If it chooses to turn left onto the main road straight away, following edge 804b, the predicted state is $s_{1B}$, represented by child node 806b. This is a terminating node since the AV has joined the main road. If state $s_{1B}$ is a safe state for the AV, the terminating node 806b is a success. However, if the state $s_{1B}$ is unsafe, for example, the AV has collided with or come to close to an external agent, the terminating node 806b is a failure.

Alternatively, at $t_0$, the AV may implement a stop manoeuvre, following edge 804a. The resulting predicted state $s_{1A}$ would, therefore, correspond to the AV stopped at the junction with the main road. The AV must then decide, at time $t_0+\Delta t$, whether to implement the turn left manoeuvre, taking edge 804b, or remaining stopped, taking edge 804a.

Again, this results in one terminating node 810b which has a state $s_{2B}$ corresponding to the AV on the main road, and one child node 810a which is not a terminating node since the AV has not joined the main road.

Figure 5A:
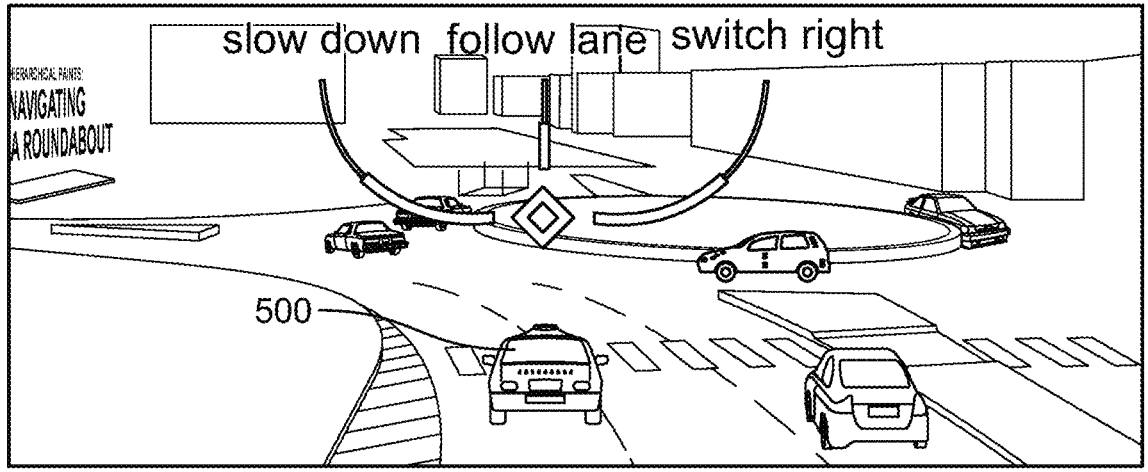
FIGS. 5A-C show examples of the present techniques implemented in a simulator.
Figure 5A:
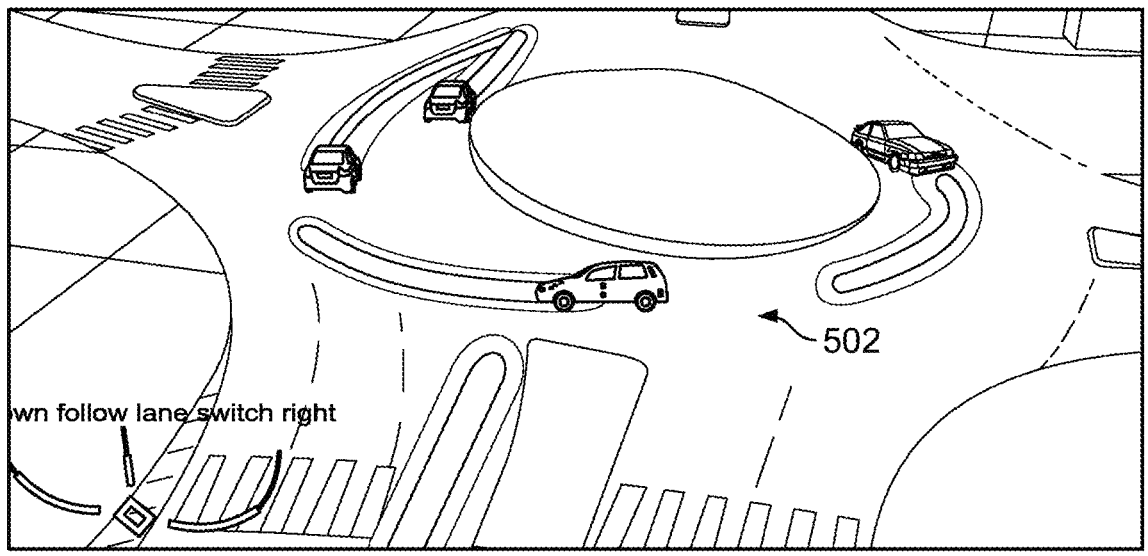
Figure 5B:
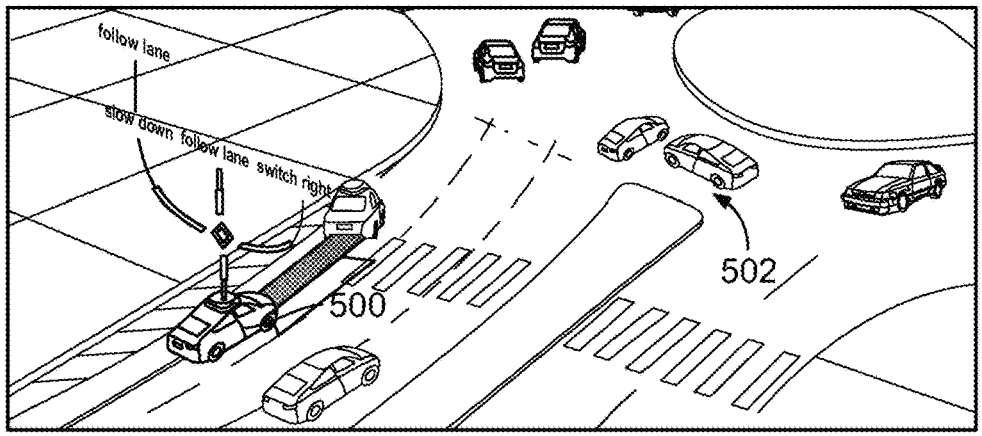
Figure 5B:
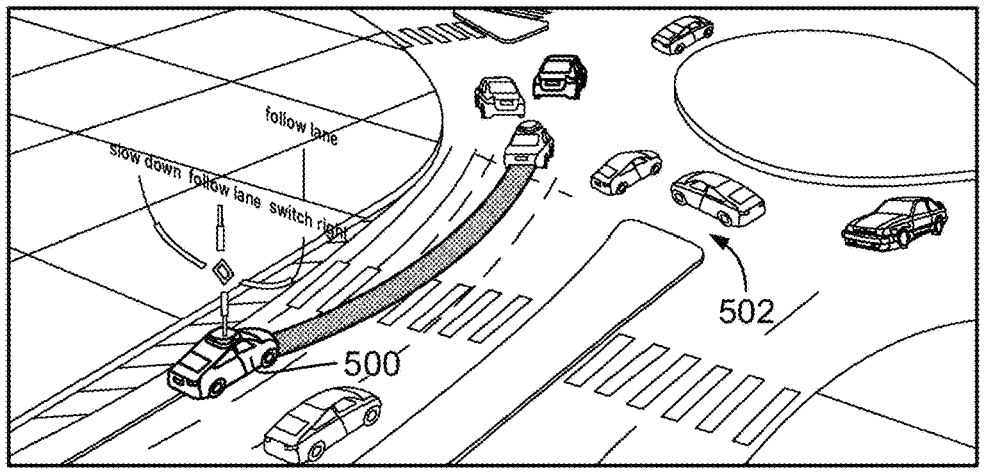
Figure 5B:
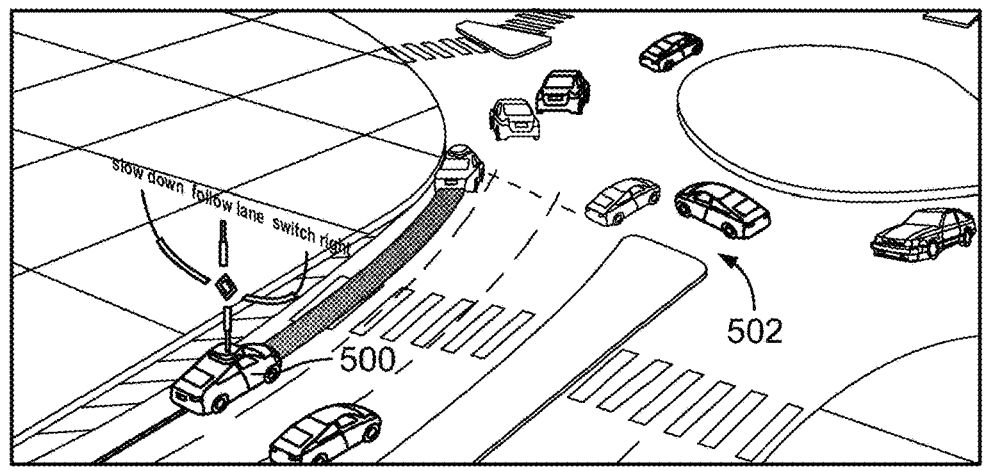
Figure 5C:
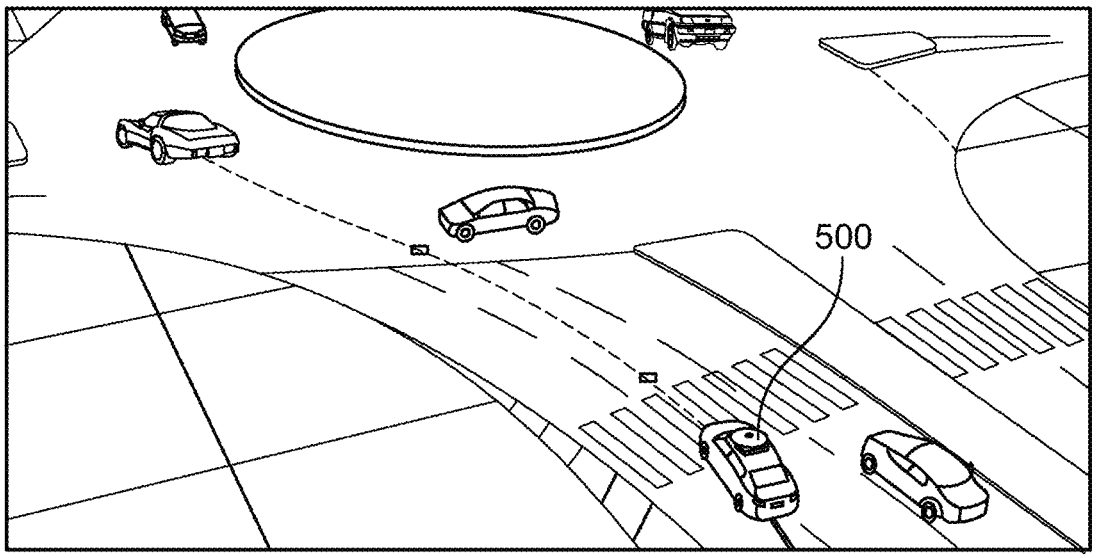
Figure 5C:
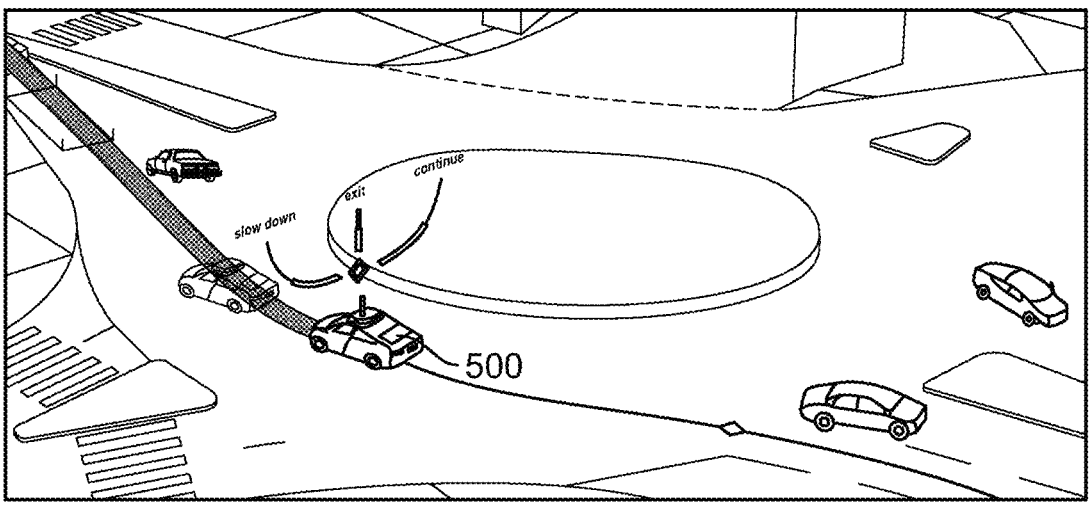
Figure 9:
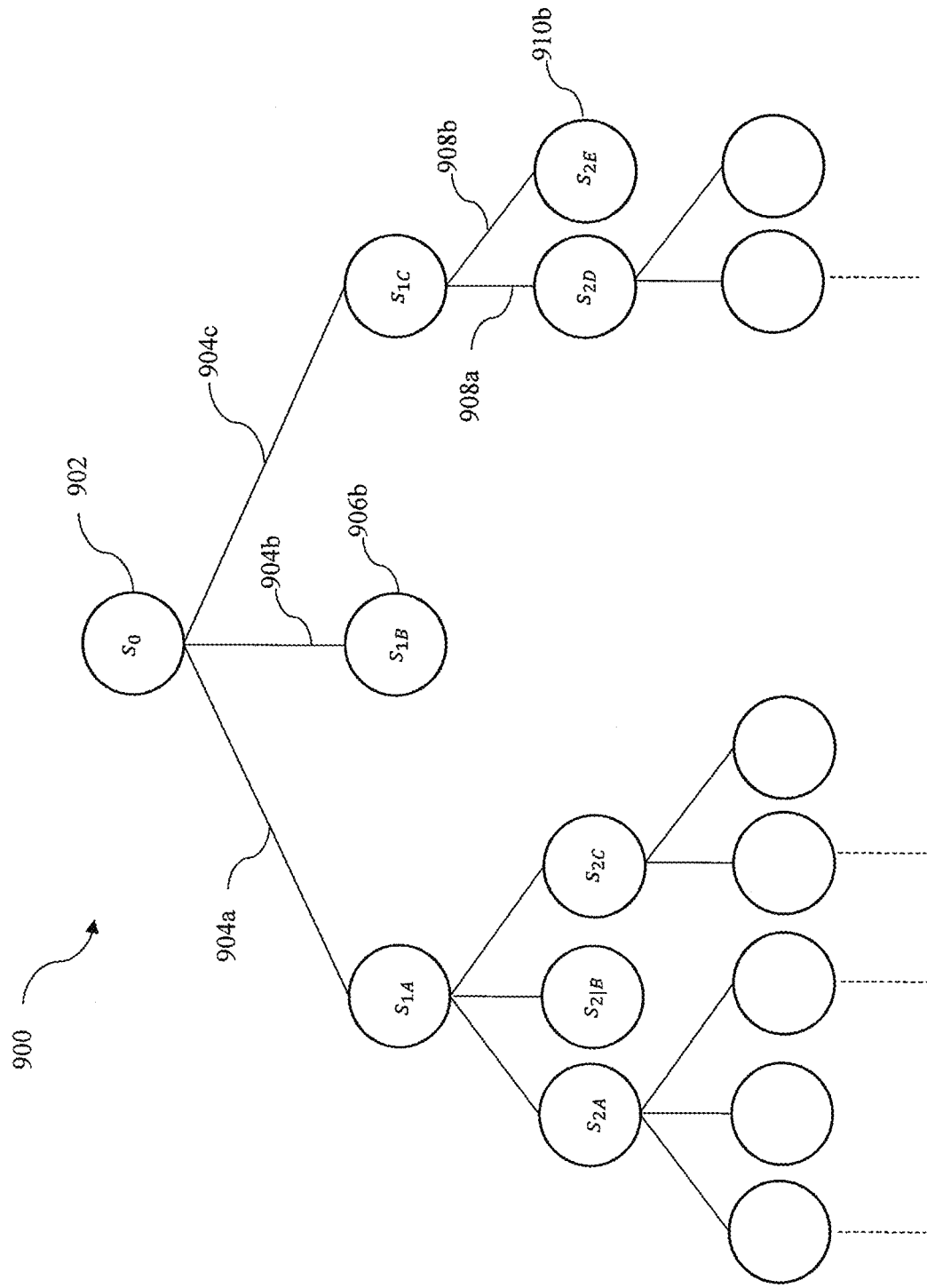
FIG. 9 shows an example of a tree search based on more than two manoeuvres.

This repeats for each additional time step, with the path terminating with a state corresponding to the AV having joined the main road. Some of these states will be failures, whereas others successes. The optimal path is then found from the constructed MCT. FIG. 9 shows an example MCT for an AV approaching a roundabout from a road with two lanes. FIGS. 5A-5C illustrate such a scenario (see below).

The goal is for the AV to join the roundabout. The initial state $s_0$ comprises the AV approaching the roundabout in the left-hand lane. The AV can perform three possible manoeuvres: stop, follow lane, and switch right. These three manoeuvres are represented by edges 904a, 904b, 904c respectively. The resultant states $s_{1A}$, $s_{1B}$ and $s_{1C}$ correspond to the AV stopping at the junction with the roundabout, joining the roundabout in its current lane, or switching to the right-hand lane of the road respectively.

If the AV follows edge 904b, the resultant state $s_{1B}$ is terminating node 906b. This is because the AV has joined the roundabout. Terminating node 906b may or may not be a successful node.

If the AV implements the move right manoeuvre, following edge 904c, the AV enters the right-hand lane of the road. The AV then has the option of continuing forward, edge 908b, or stopping, edge 908a. By continuing forward, the AV joins the roundabout, so the path terminates with terminating nod 910b. However, if the AV stops, the AV can implement at the next time interval either the manoeuvre of stopping or following lane (i.e. joining the roundabout in the right-hand lane).

If the AV implements the stop manoeuvre from the current state $s_0$, following edge 904a, it has the option to again implement any of the three manoeuvres stop, follow lane, and move right.

Each time the follow lane manoeuvre is implemented, a terminating node is generated since the AV has joined the roundabout. When the move right manoeuvre is implemented, the move right manoeuvre cannot be implemented at the next iteration, so the number of child nodes decreases by one. When the stop manoeuvre is implemented, all three manoeuvres remain possible. The MCT can be constructed for all possible paths in this way. Once the MCT is constructed, the optimal path is found.

As stated above, the MCTs do not need to be fully-constructed for a sufficiently-optimal solution to be found.

Figure 3:
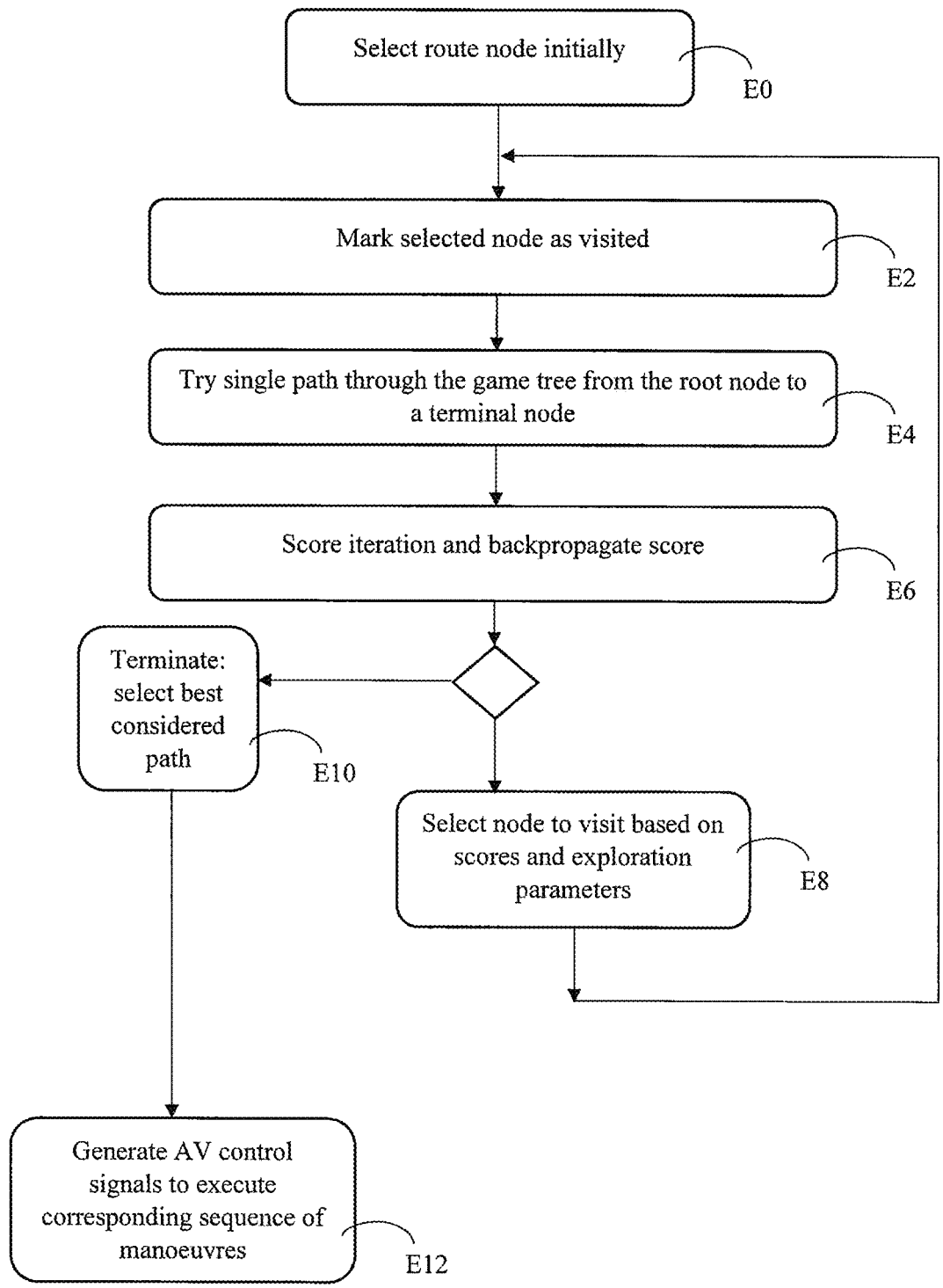
FIG. 3 shows a flow chart for a tree search algorithm that may be used to select, from a game tree, a sequence of manoeuvres to be executed.

FIG. 3 shows a flow chart for an example MCTS algorithm that may be performed on the game tree D00 of FIG. 2. As MCTS methods are known per se, the relevant steps are only briefly described in order to demonstrate the application of MCTS in the present context.

MCTS operates iteratively based on a probabilistic calculation that may be considered a form of "backpropagation" of rewards from terminating nodes under consideration (note this is a different probabilistic calculation than the chain rule used for backpropagation in neural networks).

The game tree D00 is constructed dynamically as the MCTS is performed, and will likely only be partially constructed in practice. Nodes are added every time a new state is encountered, and the possible manoeuvres the vehicle could perform from that state are hypothesised. This continues until a terminating node is reached.

Each iteration commences by traversing the existing tree, starting with the selection of the root node D02 initially (step E0). The selected nodes are marked as visited (E2), and a single path through the game tree D00 from the root node to a terminal node is tried (E4). This means running simulations to determine successive changes in the state of the driving scenario (starting from the state of the root node), as described above, until a terminating node is reached. The expansion is randomized, i.e. a manoeuvre is randomly selected and a new node is added to the tree. If the new node is not terminal, a rollout is simulated to the terminal node. The rollout is also randomised, i.e. starting from the leaf node, manoeuvres are randomly selected in order to progress from there to a terminal node. The iteration is then scored as above, and information about that score is back propagated though the visited nodes (E6). Next, an unvisited node is selected (E8), and the process repeats from step E2 with the newly-selected node.

Each iteration may commence by "visiting" a node which has not been visited before, starting with the selection of the root node D02 initially (step E0). The selected node is marked as visited (E2), and a single path through the game tree D00 from the selected node to a terminating node is expanded (E4). This means running simulations to determine successive changes in the state of the driving scenario (starting from the state of the selected node), as described above, until a terminating node is reached. The path expansion is randomized, i.e. starting from the currently-selected node, manoeuvres are randomly selected in order to progress from there to a terminating node. The terminating node is then scored as above, and information about that score is back propagated though the expanded path (E6) (note: nodes along the expanded path are not marked as visited). Next, an unvisited node is selected (E8), and the process repeats from step E2 with the newly-selected node. The unvisited node is selected based on the score information that has been back-propagated through the game tree so far, in a way that (over time) biases the selection of nodes towards more promising outcomes, whilst still encouraging a sufficient level of exploration to mitigate the risk of unwanted convergence to mere local optima.

The process repeats iteratively until it is terminated (E10). This can for example be when a certain time limit has been reached, or a certain number of iterations have been executed etc. A benefit of MCTS is that it can be terminated at any time—although the longer it has to run, the closer it will get to a globally optimal solution on average.

Upon termination, the AV planner A6 selects one of the expanded paths determined to be most promising, and generates control signals (E12) for controlling the AV to execute the corresponding sequence of manoeuvres in the real-world driving scenario is has encountered.

The most promising path may be the path having a maximum score. However, information other than score may also be taken into account (see below).

In a real driving scenario encountered by an AV, typically the road layout will be fixed and known, however the other vehicles/actors in the scenario are dynamic. Thus, it is possible that new actors will be detected as the MCTS procedure runs over time. When a new actor is detected during an ongoing MCTS procedure, the structure of the constructed game tree comprising the existing nodes and edges that have been constructed) is retained. However, simulations are re-run across the existing game tree in order to re-compute the reward functions taking into account the simulated behaviour of the newly-detected agent(s).

FIG. 5A shows an example of the MCTS process applied to a roundabout driving scenario in a simulator. The ego vehicle is denoted by reference numeral 500, and needs to plan safely at a roundabout scenario in the presence of other vehicles 502 on the roundabout. It does so by selecting a sufficiently-optical sequence of the manoeuvres "slow-down", "follow lane" and "switch to right lane" (switch right).

FIG. 5B shows how different manoeuvre sequences are evaluated by a MCTS.

FIG. 5C shows the ego vehicle 500 selecting and executing a manoeuvre sequence to enter the roundabout. The process then repeats to determine and execute a manoeuvre sequence to exit the roundabout.

As described below, MCTS can be implemented with probabilistic predictions about the behaviour of other agents. For example, the following considers both probabilistic manoeuvre detection and probabilistic goal recognition. With probabilistic predictions, the relevant distribution or distributions are sampled at the start of the process to effectively obtain a deterministic prediction or set of predictions (sample(s)). The MCTS is then repeated with different deterministic predictions sampled from the probabilistic predictions.

Figure 15:
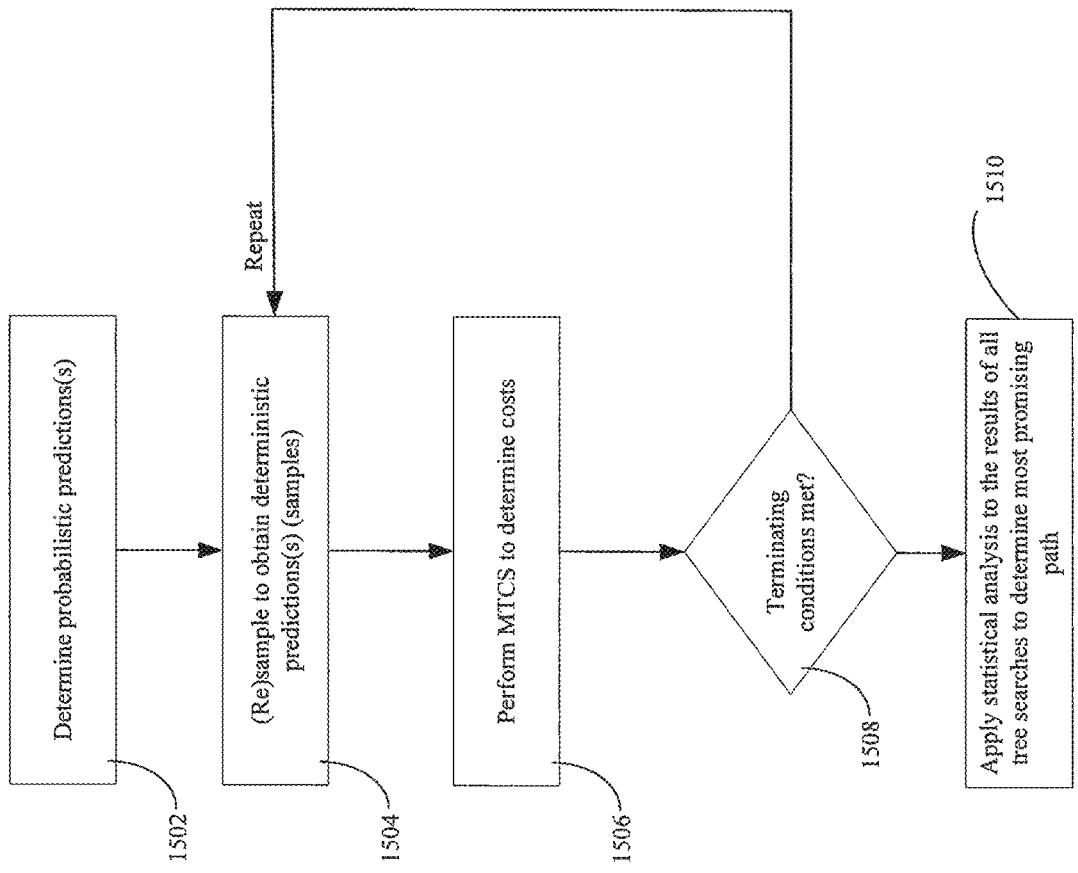
FIG. 15 shows a high-level flowchart to demonstrate certain principles of a Monte Carlo tree search applied with probabilistic predictions about other agent(s)

FIG. 15 shows a high-level flowchart of MTCS implemented with probabilistic predictions.

At step 1502, at least one probabilistic prediction is determined for an external actor. This could for example be a distribution over possible maneuvers for the agent $P(M|\tau)$ and/or a distribution over possible goals $P(G|O)$ (see below).

The notation O means a set of observations. The observations may be the observed trace $\tau$ itself ($O=\tau$), but O not necessarily limited in this respect. For example, in one implementation, the observations O could comprise a maneuver $M_j$ of the agent, in which case the notation $P(G|M_j)$ may be used (possibly as shorthand, since the observations O could include additional parameter(s)) (noting also that maneuvers may be inferred from the trace $\tau$).

At step 1504, the distribution(s) of step 1504 are sampled to obtain a set of deterministic prediction(s). For example, $P(M|\tau)$ may be sampled to choose an actual current maneuver $M_j$ and/or $P(G|O)$ may be sampled to choose an actual current goal in a statistically robust manner (such that more likely goals, maneuvers etc. are more likely to be chosen.

At step 1506, the MCTS process is performed in its entirety as described above. This may be iteration to as a "super-iteration" of the MCTS process, to distinguish from the iterative steps performed within the MCTS process to explore the tree.

Multiple super-iterations of MCTS are repeated with different samplings of the probabilistic predictions, e.g. with different goals/maneuvers sampled at step 1504 from the same goal/maneuver distributions P(G|O)/P(M|τ). That is, the probabilistic prediction(s) are re-sampled at step 1504 for each super-iteration. This repetition is shown to be performed until a set of stopping conditions is met (1508)—for example a time limit is reached, or a certain number of super-iterations is performed etc.

Having completed all of the super-iterations of the MCTS process, a statistical analysis of all of the results is applied at step 1510 in order to select a most promising maneuver sequence for the ego vehicle.

The statistical analysis at step 1510 of the overall results takes into account the scores determined in each super-iteration of MCTS. However, it can also take into account other information such as a "confidence" associated with a given maneuver sequence. Confidence reflects the extent to which a maneuver sequence has been tested via simulation. For example, it may be that a particular maneuver sequence has scored highly in one MCTS super-iteration, but happens not to have been tested in other super-iterations. In that case, the sequence has a high score but low confidence, and may be disregarded in favour of a lower scoring maneuver sequence with higher confidence, i.e. which has been more extensively tested.

External Agent Behaviour Simulation

The future movements of the external actors need to be predicted in order to determine the driving scenario state changes as the game tree D00 is constructed. As noted, such external agent behaviour is modelled for this purpose by the prediction component A4.

Various forms of generative model may be used in this context.

One example of a suitable model is an "inverse planner". By way of example, reference is made to United Kingdom Patent Application No. 1816850.0 entitled "Autonomous Vehicle Planning and Prediction", which is incorporated herein by reference in its entirety. This discloses an inverse planner which may be used in the present context to simulate external agent behaviour. Inverse planning is described below.

It may be assumed that the agents plan at the same level as the vehicle, although not necessarily using the same method.

The knowledge that is assumed to be shared by the vehicle and the external agents, for the purpose of prediction, is the map.

Further details of a particular mechanism by which MCTS for manoeuvre planning may be combined with goal recognition are described later, after the description of inverse planning.

An inverse planning component A24 is shown to form part of the prediction component A4 in FIG. 1. The inverse planning component A24 (inverse planner) implements "inverse planning" as described later.

Further or alternatively, a generative model may be trained to predict the future movements of the agents using real life driving behaviour data, such as CCTV (closed circuit television) footage.

One such example is a neural network-based model (or other trainable function approximator) which uses observer parameter(s), such as an observed trace, of an external agent for a short period of time prior to $t_0$ to predict how the agent is likely to move. This may be a probabilistic model or it may be deterministic. Such models can be used to generate realistic behaviour in driving contexts that the model has not encountered before (such as an unknown road-layout), exploiting the ability of such models to generalize from training examples when properly trained.

Another example is a model of a known driving area that is derived through direct observation of that driving area, for example based on CCTV footage. For example, in an urban driving context, models can be built for difficult driving areas, such as complex/busy junctions, roundabouts etc. One such model is a spatial Markov model, in which the driving area is divided into grid cells, and occupation probabilities for grid cells and/or transition probabilities between grid cells are determined through long-term observation, and which in turn can be used to predict external agent behaviour based on observed parameter(s) thereof.

These are examples of trained behaviour generation models.

Figure 4:
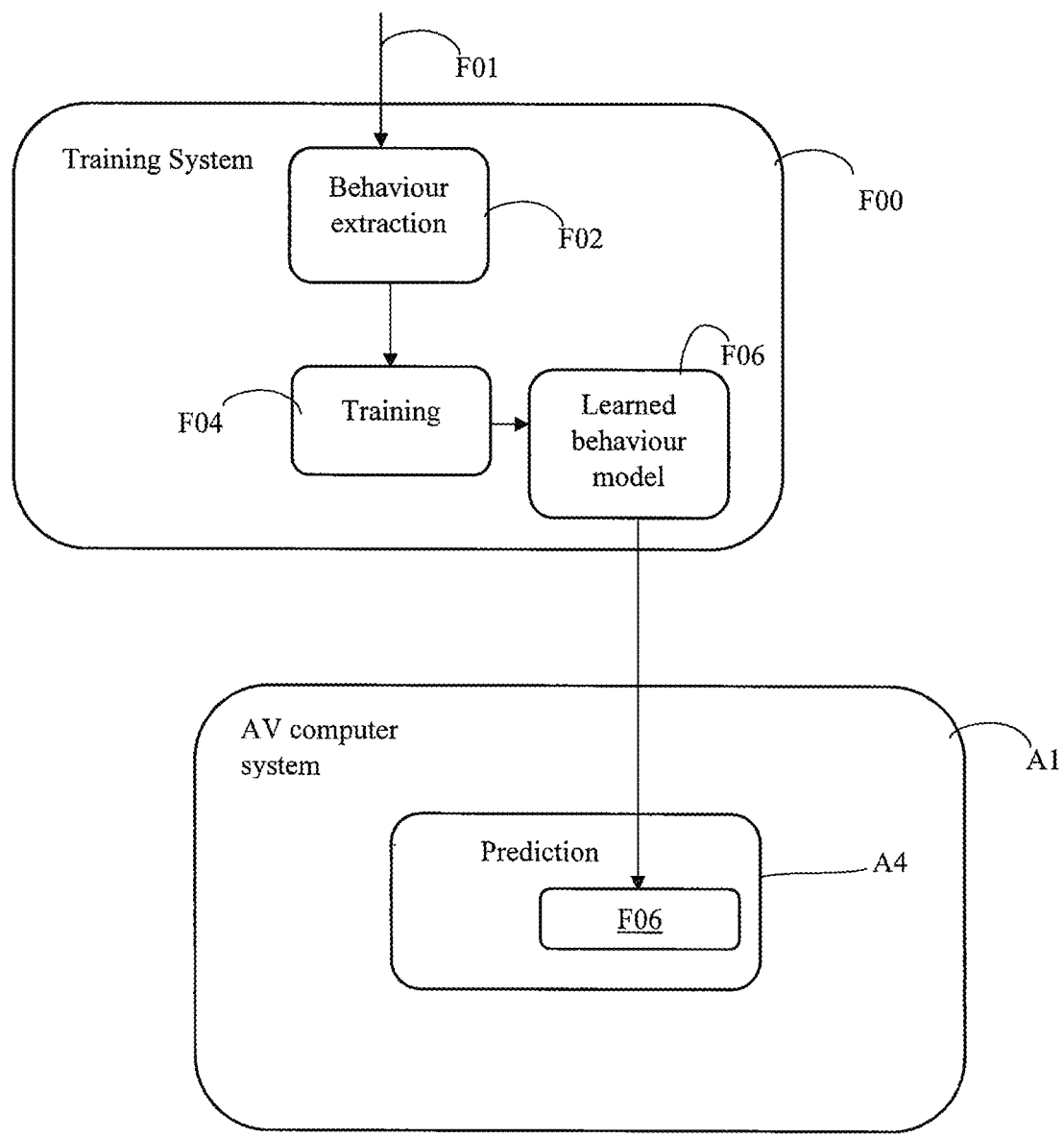
FIG. 4 shows a schematic functional block diagram of a training system for training a generative behaviour model.

With reference to FIG. 4, a generative model F06 can be trained to simulate external agent behaviour off-line in a training computer system F00. Real-world driving behaviour data F01, such as CCTV data, is received at a behaviour extraction component F02 of the training system, which processes the data to extract examples of driving behaviour for use in training. A training component F04 uses those examples to train the generative model F06 to simulate external vehicle behaviour based on observed parameters (such as an observed trace), as described above. The training component F04 and behaviour extraction component F02 are functional components of the training system F00 which are executed on one or more processors of the training system F00 (not shown). Having trained the generative model F06 in this manner, it can be incorporated in an AV by transferring it to electronic storage of the on-board computer system A1 of the autonomous vehicle, to enable the prediction component A4 to carry out the above functions.

Inverse Planning

To assist the AV planner A6 in making AV planning decisions, such as determining a sequence of manoeuvres, actions etc. to be taken by the ego vehicle to execute a defined goal safely and effectively, the inverse planner A24 predicts the movement of nearby external actors, which may be referred to as agents in the present context. The inverse planner A24 is one example of a generative behaviour model which may be applied in the above context.

Inverse planning may be implemented at the manoeuvre level, in order to make a probabilistic prediction about a current manoeuvre of an external actor. For example, the inverse planner A24 may predict a probability distribution P(M|τ) over a set of available manoeuvres M, such as "follow lane", "switch lane" switch lane etc., given a set of relevant observations comprising (or derived from) the trace T. Inverse planning at the manoeuvre-level is a form of (probabilistic) manoeuvre detection.

Alternatively or additionally, inverse planning may be implemented at the goal-level, in order to make a probabilistic prediction about a current goal of an external actor. For example, the inverse planner A24 may predict a probability distribution P(G|O) over a set of available goals G. For example, in driving scenario with a left turn, the goals could be a "turn left" goal or a "continue straight" goal (i.e. remain on the current road and do not take the left turn), captured as suitable goal locations. Inverse planning at the goal-level is a form of (probabilistic) goal recognition.

Goal recognition and maneuver detection will typically operate on different time scales. Goal recognition generally considers longer time periods into the future than manoeuvre detection. For example, manoeuvre prediction may look a few second (e.g. of order 5 s) into the future, whereas goal recognition could (depending on the circumstances) look further ahead than this. Hence, goal recognition will generally consider longer trajectories (i.e. trajectories further into the future) than maneuver recognition.

A goal may for example be captured as a desired location (reference point) on the map (i.e. in the map frame of reference) which the ego vehicle is attempting to reach from a current location on the map, where the desired location is defined in relation to an encountered road layout. For example, the desired location may be defined in relation to a particular junction, lane layout, roundabout exit etc. Given the surrounding road layout and any external actors, there will be various paths/actions the vehicle can take in order to successfully execute that goal by reaching the desired location. There will also be ego vehicle actions that would prevent the ego vehicle from doing so, for example a poorly-chosen sequence of initial actions might result in the vehicle being forced to take an unwanted roundabout exit or otherwise abort a goal due to the behaviour of an external actor when continuing to execute the goal would be unsafe. Incorporating reliable predictions as to the behaviour of external actors into the planning helps the AV planner A6 to plan safely and effectively, minimizing the occurrence of aborted goals.

When implemented at the goal-level, inverse planning hypothesises different possible goals for each external agent and then generates trajectories of how the agent might achieve each goal, and the likelihood that it would follow each trajectory. An underlying assumption is that each external agent will act in a manner that can be predicted using a generative model.

Inverse planning in the present context refers to a particular class of prediction methods that may be implemented by the AV prediction component A4. That is to say, an inverse planning method is a particular method of predicting the behaviour of external actors, and other vehicles in particular, by assuming that external actors plan in a predictable fashion.

The term "inverse planning" refers to this underlying assumption that an external actor will plan its decisions in a predictable manner. More formally, the assumption is that the other vehicle will plan and execute with a generative model that can be hypothesised.

Figure 6:
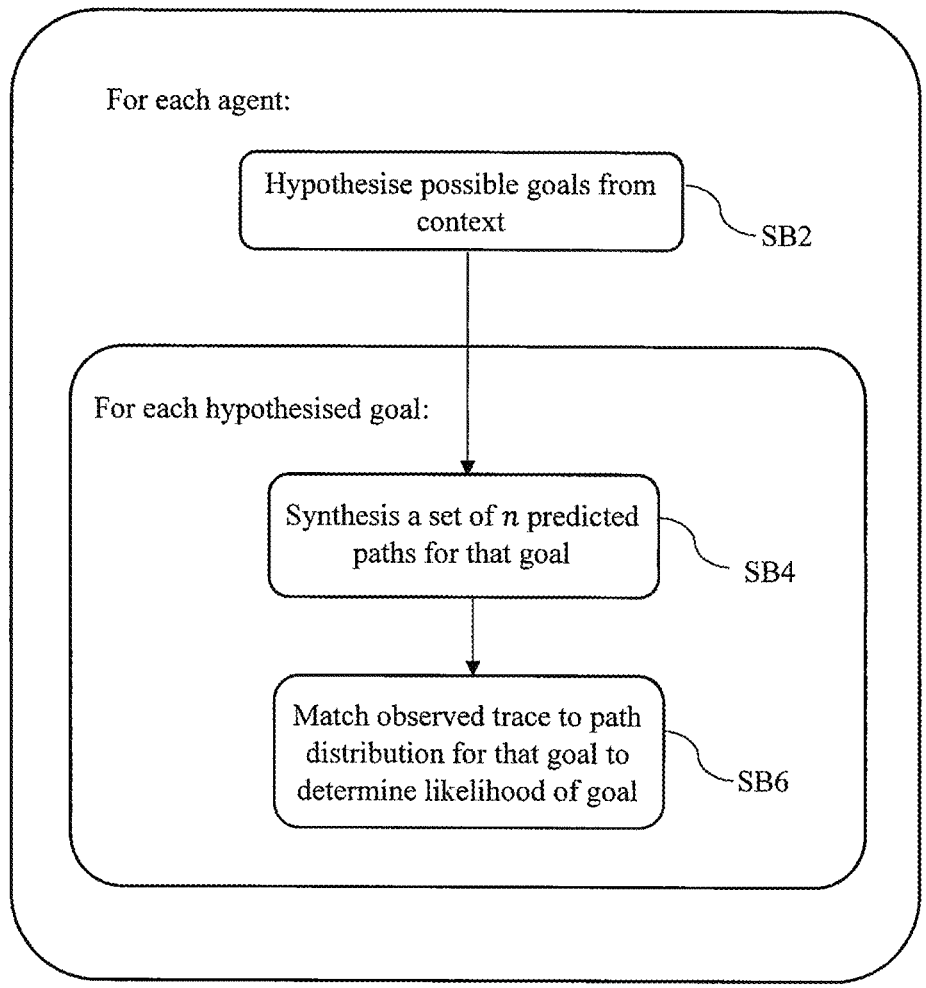
FIG. 6 shows a flow chart for an inverse planning method.

An inverse planning method will now be described with reference to FIG. 6, which shows a flow chart for the method. This considers inverse planning at the goal level but the underlying principles apply equally to inverse planning at the maneuver level. The steps of the method are carried out by inverse planner A24 repeatedly, in real-time or pseudo real-time, so that sufficiently up-to-date predictions are always available to the AV planner A6. The method makes use of the information provided by the data processing system A2, i.e. the information about the surrounding environment/road-layout, the location/state of any other actors within the environment, and the traces of those actors(s) as observed through object tracking.

The following steps are performed for each of the one or more external actors (vehicles, pedestrians, cyclists etc.) under consideration, those actors being vehicles other than the AV in the following examples.

At step SB2 (FIG. 6), a set of hypothesised goals is determined for the other vehicle in question. An assumption is that the other vehicle is currently executing one of these goals. In order to determine an appropriate set of hypothesised goals, a driving context, such as the road-layout in the vicinity of the other vehicle, is determined.

External agent goals are generally hypothesised based on the map. For example, given a set of external vehicles in the vicinity of a road junction, roundabout or other road layout indicated on the map (the driving context), suitable goals may be hypothesised from the road layout alone (without taking into account any observed historical behaviour of the agent). By way of example, with a set of external agents in the vicinity of a left-turn junction, the hypothesised goals may be turn left and continue straight. As indicated, such goals are defined with reference to suitable goal locations (e.g. reference points) on the map.

However, available goals may be hypothesised in various ways. For example, observed historical behaviour (such as a trace observed prior to time t) may be taken into account in hypothesising external agent goals, or a combination of map-based and historical behaviour-based inference may be used to hypothesise the goals.

Note that, even when historical behaviour is not used to hypothesise the available goals, it is nonetheless used to determine the likelihood of each of those goals (because $P(G|O)$ depends on the observations O of the agent's behaviour).

Having determined the set of hypothesised goals, the following steps are performed for each of those goals:—

At step SB4, an expected trajectory model is determined for the hypothesised goal in question. The expected trajectory model is a model that simulates future behaviour of the other vehicle on the assumption that it is executing that particular goal. In particular, the expected trajectory model indicates how likely it is that the other vehicle will take a particular path or paths (trajectories) within a given time period $\Delta t$ (from time t to time $t+\Delta t$) assuming that it is executing that goal during that time period $\Delta t$. As indicated, the goal the vehicle is executing may be parameterized by an end point based on the map. For example, if the goal is to continue straight (rather than, say, turn left) the end point may be a point on the road at a set distance, say 40 m, ahead of the vehicle in the same lane. Alternatively, in e.g. a multi-lane scenario, the goal location could be some distance along the road ahead without specifying a specific lane (see below for further details).

The expected trajectory model may simply be a (single) predicted path for a given goal, but in the present examples it takes the form of a predicted path distribution for the goal in question. The predicted path distribution is provided for each goal in the present instance by synthesizing a discrete set of n predicted paths for the goal in question given a location $r_t$ of the external vehicle at time t, thereby providing a predicted path distribution for at least the time interval $\Delta t$.

Figure 7A:
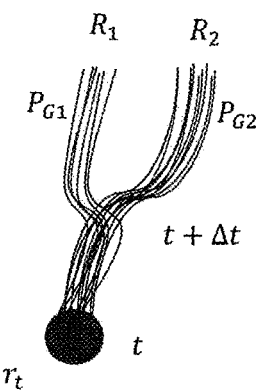
FIGS. 7A-C illustrate certain principles of inverse planning by example.

By way of example, FIG. 7A shows respective sets of predicted paths $P_{G1}$, $P_{G2}$ for goals G1 and G2 respectively as predicted for a particular external vehicle. The goals $G_1$, $G_2$ are defined with respect to reference locations $R_1$, $R_2$ respectively in the map frame of reference, which can be points or areas on the map. Given the location $r_t$ of the external vehicle at time t and the reference points $R_1$, $R_2$ of each goal, the predicted path sets $P_{G1}$, $P_{G2}$ are synthesized for goals $G_1$, $G_2$ respectively.

Although in this example, each goal is defined simply with respect to a single reference point/area, as will be appreciated, goals can be defined in other ways, for example with reference to multiple reference points as appropriate in the circumstances. In general, a goal is defined by a set of one or more goal parameters, which in turn are generally defined in the map frame of reference in the context of autonomous driving. A reference location in the map frame of reference is one example of a goal parameter, and all description pertaining to such reference locations applies equally to other types of goal parameter.

Following the left turn example, one set of paths would be generated for the "continue straight" goal, which are paths it is predicted the other vehicle might take were it executing the "continue" goal, and another set of paths would be generated for the "turn left" goal, which are paths it is predicted the other vehicle might take were it executing the "turn left" goal.

A generative model may be used to synthesise these paths. The underlying assumption is that the other vehicle will plan and execute with this model. That model could correspond to the AV planner A6 itself (on the assumption that other vehicles will plan in the same way as the ego vehicle), but it may also be different from the AV's own planner.

For example, the paths can be synthesised for each goal using a Rapidly Exploring Random Tree (RRT) model. Following the example of Figure CA, for each goal $G_1$, $G_2$, a space of predicted paths (search space) is defined based on the reference location for that goal ($R_1$, $R_2$ respectively) and the current location $r_0$ of the external vehicle. The search space is then randomly sampled (based on randomized input parameters), in order to determine the set of n paths, and a likelihood of each of those paths. To simulate n paths for each goal, the relevant parameters of the RRT are randomized n times to perform n appropriately biased random searches of the search space.

By way of example, GB Patent Application No. 1803292.0 entitled "Efficient computation of collision probabilities for safe motion planning", which is incorporated herein by reference in its entirety, discloses an RRT model which can be used in the present context to implement inverse planning. The probabilistic risk of collision along a given trajectory is calculated, and used to rank order the candidate trajectories by safety. This in turn provides the likelihood of each sampled path on the assumption that the external vehicle is more likely to take safer paths to execute the goal in question. That is, path probabilities can be determined based on assumed relationship to safety. The sampled paths and their probabilities are one example of a trajectory model.

However, this is just one example of a suitable generative model, and other forms of generated model may also be used. An example of an alternative trajectory model is described later.

One such example is a neural network-based model which has been trained to output a path prediction model (e.g. a predicted path or a distribution of predicted paths) given an observed trace and a goal to be executed. The network is trained based on real-world driving behaviour examples. For example, the neural network may be trained based on examples extracted from a large corpus of CCTV (closed circuit television) data that has been captured in urban driving environments.

Another example is a spatial Markov model (or similar), which may be predetermined for a particular driving area by monitoring the driving area over a sufficient time period (see above).

In general, the inverse planner A24 can be any model which can reason in relation to different hypothesised goals.

At step SB6, the trace of the other vehicle as actually observed over the time period $\Delta t$ (i.e. between time t and t+$\Delta t$) is matched to the distribution of paths associated with the goal in question for that time period $\Delta t$, in order to determine a likelihood for that goal.

Figure 7B:
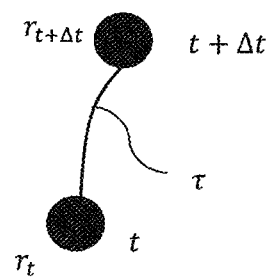

By way of example, FIG. 7B shows an actual observed tracer of the vehicle in question between time t and t+$\Delta t$. By matching the actual trace r to the predicted path distribution for each of the goals $G_1$, $G_2$ (FIG. 7A) a likelihood of each goal $G_1$, $G_2$ can be determined probabilistically for the time interval $\Delta t$. This can be a form of soft-matching. The goal likelihood can be captured as a conditional probability of each hypothesised goal $G_i$ given the observed trace r of the external vehicle, i.e. $p(G_i|T)$, which is the estimated probability that the external vehicle was executing that goal $G_i$ over the time interval $\Delta t$ given the observed trace T.

In other words, the inverse planner A24 is used to predict, for each of the hypothesised goals, a set of possible paths that the other vehicle might have taken in the time interval $\Delta t$ and a likelihood of each of those paths, on the assumption that the other vehicle was executing that goal during that time period (i.e. what the other vehicle might have done during time interval $\Delta t$ had it been executing that goal). This is then compared with the actual trace of the other vehicle within that time period (i.e. what the other vehicle actually did), to determine a likelihood of each goal for the time period $\Delta t$.

Figure 7C:
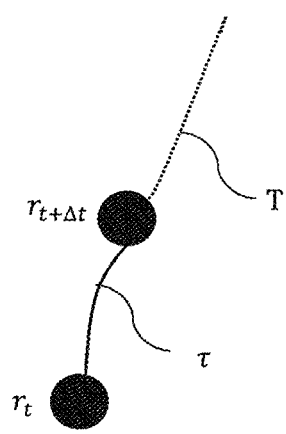

With reference to FIG. 7C, now that the likelihood of each goal, given the observed trace r, is known, the (absolute) likelihood of any given predicted path (trajectory) T after time t+$\Delta t$, given the observed trace r, can for example be determined as:

$$p(T|\tau) = \sum_i p(T|G_i)p(G_i|\tau)$$

where $p(G_i|\tau)$ is defined above and $p(T|G_i)$ is an estimated probability of the agent taking path T given a path distribution for goal $G_i$ at time t+$\Delta t$. Note, the notations "$\Delta t$" and "$\Delta T$" are equivalent herein. Note also the distinction between the mathematical notation used to represent trajectories (lower or uppercase Greek letter "tau", i.e. $\tau$, T) and the notation used to represent time (lower case or uppercase Latin "t", i.e. t, T).

A trajectory can be a simple spatial path but the description applies equally to trajectories that incorporate motion information (such speed/velocity information, acceleration). For the latter, two trajectories may correspond to the same spatial path (or at least respective portions of the trajectories) may correspond to the same spatial path) but nonetheless be different trajectories e.g. because they are associated with different velocity information (e.g. one might correspond to a vehicle moving along substantially the same spatial path but at a lower speed, at least at some points along the spatial path). For example, a trajectory may take the form of a spatial path in combination with an associated velocity or a set of velocities associated with respective point or sections of the spatial path. An extension could additionally incorporated associated acceleration value(s) etc.

Although not shown in the Figures, the path distribution at time t+$\Delta t$—from which $p(T|G_i)$ is determined—can itself be determined by e.g. re-executing the inverse planner A24 at time t+$\Delta t$ for goal $G_i$ as above, but with a new determined location of the external agent $r_{t+\Delta t}$ at time t+$\Delta t$, in order to update the expected trajectory model accordingly. The goal parameters may or may not have been updated at this point for the purpose of re-executing the inverse planner A24. Where a data-driven behaviour model is used, similarly the behaviour model can be re-executed at that time, in order to update the expected trajectory model.

The above steps are performed repeatedly over time, possibly in real time. For an external agent that is some way off reaching its goal, initially it may not be possible to determine definitively which goal it is executing, because the path distributions for different goals are similar initially, and this will be reflected in the distribution of probabilities of over the set of hypothesized goals. As the path distributions diverge, the probability distribution will generally begin to skew towards a particular goal as the path distributions diverge.

Inverse Planning for Manoeuvres

The above considers inverse planning for goals. As indicated, inverse planning can also be implemented at the manoeuvre level, over a set of hypothesised manoeuvres M.

For example, if the other vehicle is currently driving on a multi-lane road, with no nearby junctions, the set of hypothesised manoeuvres M may consist of "follow lane" and "switch lane". In that case, one set of paths would be generated for the "follow lane" manoeuvre, which are paths it is predicted the other vehicle might take were it currently executing the "follow lane" manoeuvre, and another set of paths would be generated for the "switch lane" manoeuvre, which are paths it is predicted the other vehicle might take were it executing the "switch lane" manoeuvre. The above description applies equally to manoeuvre-level inverse planning, but with the set of hypothesised manoeuvres M in place of the set of hypothesised goals G.

For manoeuvre-level inverse planning, an observed trace $\tau$ of the external agent can be used to estimate a probability of each manoeuvre $M_j \in M$ of the set of possible manoeuvres M. For each maneuver $M_j \in M$, a predicted trajectory model is determined for time t, as in FIG. 7A. The predicted trajectory model can be single trajectory or a trajectory distribution. Then, by comparing the actual observed trace $\tau$ to the trajectory model for each maneuver $M_j$ (as in FIG. 7B), a probability of that maneuver $P(M_j|\tau)$ can be estimated based on the extent to which the observed trace $\tau$ matches the trajectory model for that maneuver $M_j$. As above, this can be a form of soft-matching.

In the following example, in order to simplify the computations, each maneuver $M_j$ is mapped to a single trajectory for the purpose of inverse planning. For a maneuver that is associated with a trajectory distribution, the mode or most-likely trajectory of the distribution may be taken for the purpose of inverse planning. In that case, there is assumed to exist a single trajectory $T_j$ such that $$P(T_j|M_j)=1$$

and the probability of all other trajectories is assumed to be zero.

The notation used above distinguishes between a trajectory $T_j$ associated with a given manoeuvre $M_j$ and a trajectory T evaluated with respect to a given goal $G_i$.

In order to reach the goal $G_i$, the external agent may execute a sequence of manoeuvres, e.g. $(M_j, M_k, \ldots)$. In that case, an overall goal trajectory (i.e. to reach the goal $G_i$) may be determined as a combination of maneuver trajectories associated with the individual maneuvers $M_i, M_j, \ldots$. For example, in the implementation described below, a goal trajectory is determined by combining maneuver trajectories and applying velocity smoothing thereto. For this reason, a trajectory $T_i$ associated with (or evaluated in relation to) a maneuver $M_i$ may be referred to as a "partial trajectory" and a trajectory T associated with (or evaluated in relation to) a goal may be referred to as a "full trajectory".

Where multiple trajectories to a particular goal $G_i$ are considered, the notation $T^{(n)}$ may be used in place of T to refer to the nth trajectory to the goal $G_i$.

This above simplifying assumption of a "one-to-one" relationship between partial trajectories and manoeuvres has been found to give acceptable performance with a reduced computational burden. However, alternative implementations, which do not make this implying assumption of a "one-to-one" relationship between trajectories and manoeuvres are nonetheless viable. Without this simplifying assumption, a more general Bayesian still relation holds:

$$p(T_j|\tau) = \sum_l p(T_j|M_l)p(M_l|\tau)$$

where $p(T_k|M_j) \in [0,1]$ is the probability of partial trajectory $T_j$ given maneuver $M_l$. In that case, rather than assuming the mode/most likely partial trajectory, partial trajectories could instead be sampled from $p(T_j|M_j)$, and all description herein pertaining to the mode/most likely partial trajectory applies equally to a sampled trajectory in that case.

Inverse Planning—Example Implementation

By way of further illustration, an example implementation of inverse planning for goal recognition will now be described in further detail. This uses inverse planning at the goal-level to predict a probability distribution P(G|O) over a set available goals G for at least one external agent, i.e. for each available goal, an estimated probability that the agent is currently implementing that goal.

The described implementation additionally uses probabilistic manoeuvre detection to predict a distribution P(M|$\tau$) over a set of possible manoeuvres M given an observed tracer of the external agent, i.e. for each possible manoeuvre, an estimated probability that the agent is currently executing that manoeuvre. Maneuver predictions feed into goal predictions as described later. Maneuver detection can, for example, be implemented using inverse planning at the manoeuvre-level.

In other words, the described implementation reasons at both the manoeuvre-level and the goal-level.

Goal Recognition

Goal recognition is the process of inferring agent goals of an agent (external actor—which is a target vehicle in the following examples but can be another form of actor as noted) given observations of the agent's past actions and other contextual information.

In the present context, a goal would typically specify a target location for the vehicle over whose goals the inverse planner A24 is reasoning, such as the various exit points on a highway/junction or the different lanes. Knowledge of another agent's goals can inform the planning process because predictions can be made about the agent's behaviour in relation to its hypothesised goals.

Using goal recognition also adds to the "explainability" of the AV system. Explainability refers to the system's ability to explain its decisions to a human. Recording the goal inference process (what the ego vehicle believed the other vehicles' goals to be at different times) can provide interpretable information for decision tracing and debugging.

Goals may be inferred deterministically or probabilistically. In the following examples, goals are inferred probabilistically given a set of relevant observations O, i.e. a goal posterior P(G|O) is estimated for a finite set of available goals G, with $P(G_i|O)$ being the probability that the external agent has goal $G_i \in G$ given the observations O.

In the context of MCTS, goals are inferred probabilistically so as to make a reasoned prediction about the external actor's future trajectory as the tree is rolled out in the above sense.

Maneuvers and Goals

First, an example scheme for determining available goals and manoeuvres is described. This description provides relevant context to the particular implementation of inverse planning that is described later. However, the description is not limited in this respect and applies equally to other implementations of MCTS, including alternative implementations of inverse planning/goal recognition and implementations which do not use goal recognition (e.g. the examples given above which use dada-driven behaviour models without higher-level goal recognition).

Multipolicy Baseline

A "multipolicy method" is used as a baseline. The underlying assumption of the multipolicy method is that all vehicles (or, more generally, external actors), including the ego vehicle, are at any time executing one of a finite number of maneuvers such as follow lane, lane change, turning, etc. Such maneuvers may also be referred to herein as "maneuver policies" (noting the distinction between a manoeuvre policy, i.e. a manoeuvre of a finite set of manoeuvres, and an action policy which may be used to execute a selected maneuver policy; note also that the English/American spellings of manoeuvre/maneuver are used interchangeably herein).

A "target" actor means an external actor whose behaviour is being predicted. Predictions may be made for one or multiple target vehicles (or other actors) and the above set of assumptions is applied to each target actor. The maneuver policy examples in the preceding paragraph are, in reality, "closed-loop", meaning that they take sensor feedback into account and automatically vary their speed and distance to a leading vehicle (the leading vehicle been a vehicle which the target vehicle is following). However, as explained below, for the purpose of inversely planning, they can be modelled as "open-loop" manoeuvres with the benefit of increased computational efficiency and without significantly affecting the performance of the inverse planner A24. The target and leading vehicles are cars in the following example but the description applies equally to any form of actor (vehicles, pedestrians, cyclists etc.). Similarly, this example considers an autonomous car (ego car) but the description applies to any form of autonomous vehicle.

Figure 12:
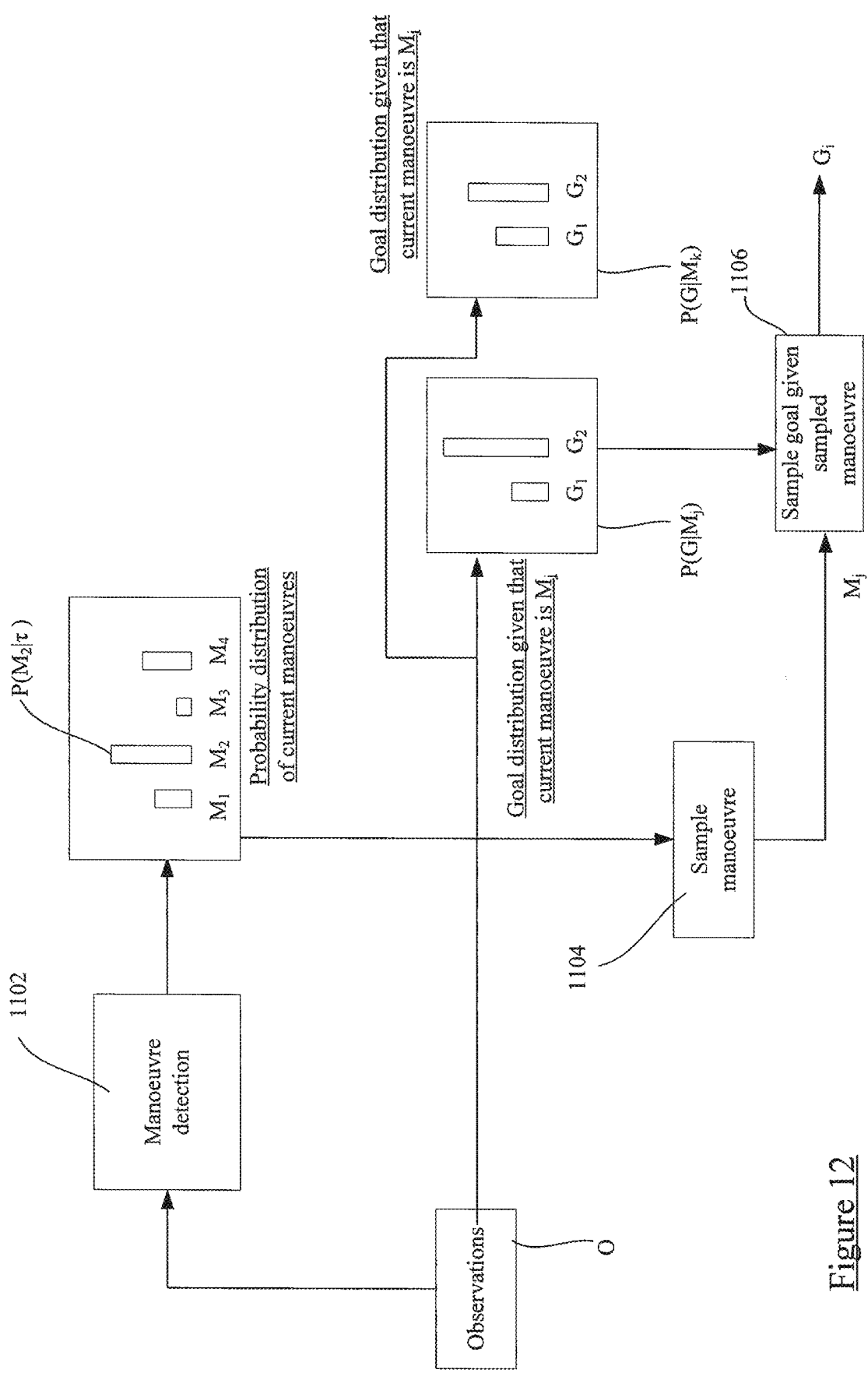
FIG. 12 shows a schematic function block diagram for a maneuver planning method which incorporates predictions from inverse planning.

FIG. 12, described in detail below, shows a manoeuvre detector 1102 as part of the prediction component A4.

As one example, the maneuver detector 1102 can implement inverse planning at the manoeuvre-level, in the manner described above.

As another example, the manoeuvre detector 1102 may implement a Bayesian changepoint detection method. This method is used to segment an observed low-level trajectory of a target vehicle into a sequence of maneuvers, and the most recent segment is used as a prediction of the car's currently executed maneuver. Using this prediction, a number of forward trajectories are simulated for each maneuver available to the ego car, and the maneuver with the best evaluation is chosen for execution.

Bayesian changepoint detection is known per se and refers to a probabilistic detection of changes in an underlying hidden state of a system. In the present context, the hidden state of an external actor at a particular time is defined as the manoeuvre policy it is executing at that time. This hidden state is not directly observable and therefore needs to be inferred though observations caused by the hidden state—the observed trace in this instance. This allows the probability of each available maneuver to be estimated at a current point in time, i.e. the probability that the external actor is currently executing that maneuver.

For example, a hidden Markov model (HHM) may be used to represent manoeuvres as hidden states of the HHM, in which the observed trace is modelled as arising from state transitions of the HMM.

As described below, it is possible to define a relatively small set of maneuver policies to significantly simply the planning process. It is possible to define such a small set because of the maneuver policies are defined in a way that encompasses low-level planning such as velocity and distance. Similarly, since other cars are assumed to be executing one of these same policies, their current maneuvers can be efficiently inferred given low-level trajectories.

This multipolicy method per se is myopic in that it only predicts the current maneuver of other cars, but it does not attempt to predict their future maneuvers. Inverse planning builds on this method to predict future actions as described later.

Maneuvers

Basic Maneuvers

Maneuvers represent the basic actions used for planning and predicting. The following "basic" (elementary) maneuvers are considered in this example:

lane follow
lane change left/right
turn left/right (turning into closest lane in driving direction)
stop/cautious It will be appreciated that the described techniques can be extend to alternative or additional maneuvers.

Each basic maneuver has specified applicability and termination conditions associated therewith. A maneuver is only available in a given state if the state satisfies the maneuver's applicability condition. For example, a lane change left is only possible if there is a lane to the left of the car, and if there is sufficient open space on that lane for the car. Applicability conditions may also encode traffic rules. The maneuver terminates if the state satisfies the termination condition. For the lane change maneuver, this is the case once the car has arrived on the lane and is aligned with the lane direction.

Between start and end of a maneuver, the maneuver specifies a reference path to be followed by the ego car and the target velocities along the path. In the present context, a trajectory is defined as the pair (static reference path, target velocities). That is, as a static reference path plus an associated set of target velocities (see above).

However, in general, a maneuver be associated with multiple trajectories. For example, in the context of prediction, a manoeuvre could be associated with a trajectory distribution, i.e. set of trajectories each having a specified probability (i.e. the probability that the external actor will follow that trajectory assuming it is currently executing that maneuver).

Some maneuvers, such as lane follow and cautious, do not have natural termination conditions. For such maneuvers, a termination condition is specified as a parameter. "Macro actions" (see below) automatically set these parameters based on context information.

The cautious maneuver is a variant of a stopping maneuver which is used in macro actions. Cautious slows the car down and continues to move to a specified location given as parameter. At the location, the maneuver terminates if the terminal condition is satisfied, otherwise it fully stops the car and then terminates when the terminal condition is satisfied. The terminal condition is used to check for oncoming traffic in specified lanes (given as parameter). If no lanes are specified, then the terminal condition is always true. This allows the car to plan for safe and smooth entering/exiting when there is possible oncoming traffic. As a special case in cautious only for exit left/right macros, a forced termination is allowed if the oncoming vehicle is stopped and is predicted to remain stopped for at least the amount of time needed for the controlled car to complete the turn maneuver. This allows for special cases such as in Scenario 3 described below.

Some of the basic maneuvers are only used inside macro actions, either because they have additional parameters or because they are only possible in very specific locations, such as the turning maneuver.

The following example uses two types of basic maneuvers: open-loop maneuvers for inverse planning (prediction) or goal recognition more generally, i.e. by the goal recognition component A24 in FIG. 1, and closed-loop maneuvers for MCTS ego planning in the planner A6 of the AV. These are detailed in the sections below.

Closed-Loop Maneuvers

A basic maneuver is closed-loop if it uses feedback from sensors. This may cover different degrees of automation in maneuvers. Here, it is assumed each closed-loop maneuver automatically controls the car's velocity and distance to leading vehicle (a form of adaptive cruise control (ACC)). It is also assumed that each maneuver is capable of automatically initiating an emergency brake.

The system is agnostic about the specific implementation of maneuvers, and essentially views them as "black box" functions. This has the benefit of flexibility and allows different representations to be incorporated straightforwardly. Possible implementations include:

hard-coded heuristic using finite state machine or any programming logic
lattice path planner using motion primitives defined by kinematic bicycle model
constraint optimisation planner The planning methods in above list can be called repeatedly after state changes to make them closed-loop.

Open-Loop Maneuvers

In contrast to closed-loop maneuvers, open-loop maneuvers do not use sensor feedback. An open-loop maneuver specifies a reference path (or a distribution over paths) without attempting to correct these paths with feedback. This allows for simpler and computationally less costly implementations of maneuvers.

Again, the system is agnostic about the representation of open-loop maneuvers.

A simple but effective may of implementing open-loop maneuvers fits a polynomial function to a set of points extracted from the road topology. Target velocities may be set to a constant or other time series. This computes one trajectory rather than a distribution over trajectories, which has been found to be sufficient in many practical contexts.

Figure 13:
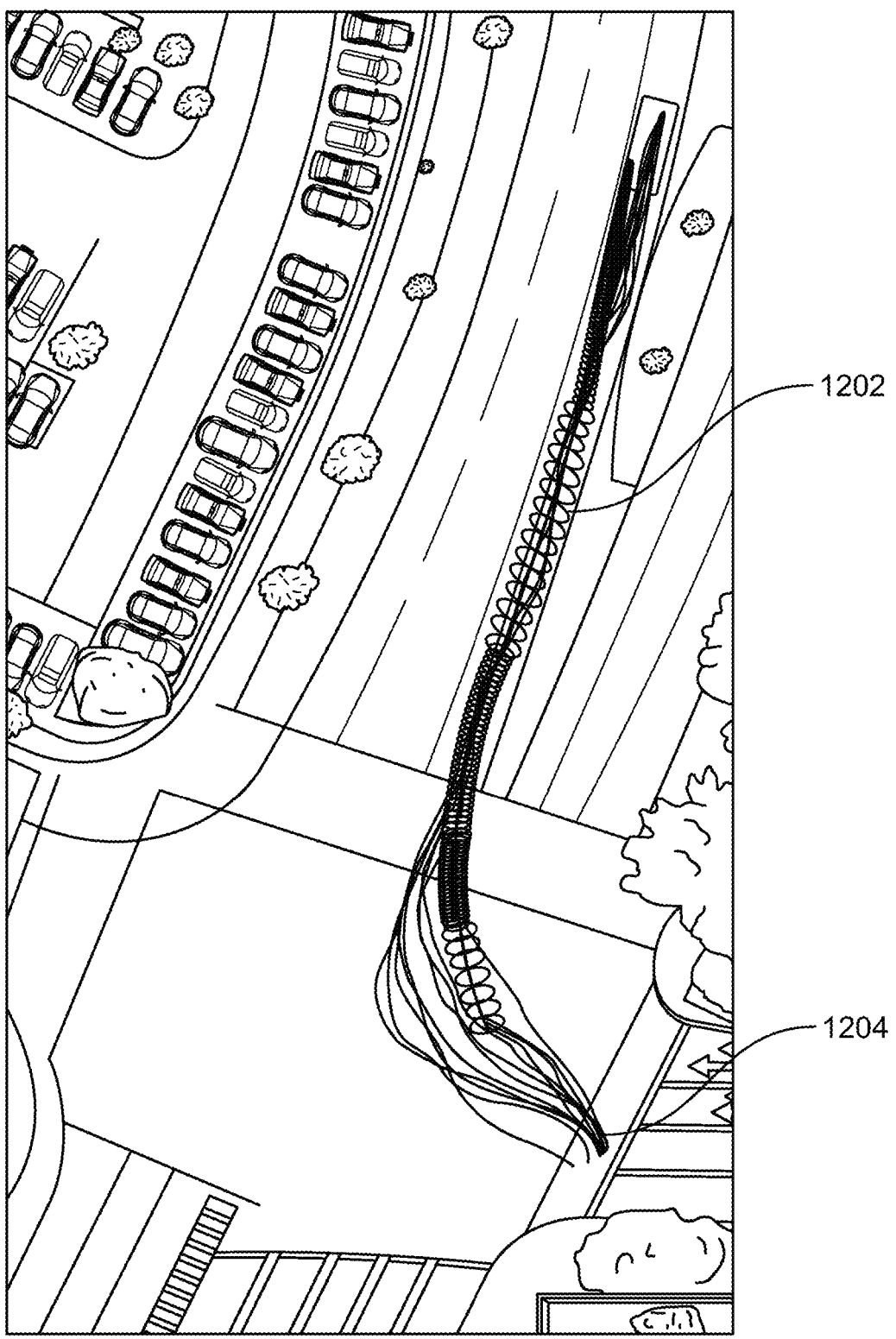
FIG. 13 shows an example of a trajectory model learned from CCTV data.

Another implementation uses a behaviour model of the kind described above, such as a Gaussian process or neural network, to collected driving trajectories. This trajectory data may be generated in different ways:

In simulation, under varying situations, using the corresponding closed-loop maneuver
From real driving data generated with the AV platform
From real CCTV data, segmented into recognised maneuvers. By way of example, FIG. 13 shows an example of a Gaussian trajectory model 1202 fitted to trajectories observed in CCTV footage over time.

Conditions such as "wait until oncoming traffic is clear", as used in the cautious maneuver, may be realised in open-loop maneuvers by waiting for a specified time until the condition is predicted to be true (e.g. waiting until it is predicted that traffic is clear).

Target Velocities and Velocity Smoothing

As noted, in the present example, a trajectory is defined as a static path in combination with a set of target velocities.

Target velocities are set inside basic maneuvers. As a general principle, it may (for example) be assumed that vehicles will attempt to drive at a certain speed in a particular area (e.g. a speed limit). This target is reduced if there is a slower car in front (in which case that car's velocity is the new target) or if required due to curvature in the driving path etc.

For open-loop lane-follow, the target velocities are set to min(speed-limit, speed of car in front if any).

Due to its simplicity, this method is cheap to compute but it can lead to predicted trajectories for other vehicles which collide. For example, in Scenario 1 below, a truck is predicted to continue straight at speed limit (as no vehicle in front) and an over-take by Car 2 at the speed limit (during the lane follow segment of overtake) is also assumed. The predicted trajectories for Car 2 and Truck may collide because the inverse planning for Car 2 actually assumed a constant velocity for the truck. However, in this case and many other cases, it has been found that this discrepancy does not cause problems for the ego planner A6: safe and effective planning decision can still be taken using the predictive output of this simple method.

Within basic maneuvers that generate curved trajectories (e.g. turning and lane changing), the target velocities are set using a heuristic based on local curvature. This function is shown below, where $v_{target}$ is the target velocity, and $\psi$ is the point curvature. The other terms are constants set to appropriate values $$v_{target} = \max(v_{min}, v_{max} - c\psi)$$

Point curvature is given by the equation below, where x and y are Cartesian coordinates. The derivatives of x and y are estimated from the target path for the vehicle using finite differences:

$$\psi = \frac{|x'y'' - y'x''|}{(x'^2 + y'^2)^{\frac{3}{2}}}$$

Velocity Smoothing

Because velocities are set inside basic maneuvers, two subsequent maneuvers may have abrupt changes in velocities. The typical example is a lane-follow followed by a turn maneuver.

To compensate for this effect, a resulting complete trajectory across different maneuvers can be smoothed out in velocities to improve control and realism. A velocity smoothing function is used which optimises the target velocities in a given trajectory. Velocity smoothing is used for both prediction (inverse planning) and MCTS ego planning.

Velocity smoothing is formulated as an optimisation problem over a trajectory along the path given. Assuming a set of points at longitudinal positions, $x_T^i$, and their respective target velocities $v_T^i$, a continuous and differentiable function $\kappa : x \rightarrow v$ is fitted. Then, considering a time horizon $T_H$ (which could, for example, be estimated using the target velocities), the time elapsed between two time points $\Delta t$, and other parameters of the optimization (e.g. maximum speed, $v_{max}$, and acceleration, $a_{max}$), the smoothing problem is defined as:

$$\min_{x_{1:N}, v_{1:N}} \sum_{t=1}^{N} \|v_t - \kappa(x_t)\|_2$$

s.t. $x_{t+1} = x_t + v_t \Delta t$ $0 < v_t < v_{max}$ $|v_{t+1} - v_t| < a_{max} \Delta t$ $N = \lceil T_H / \Delta t \rceil$ From the solution of the problem, spatially re-sampling may be used to obtain values that are actually achievable at $x_T^i$. The last achievable position is given by $x_N$. If $x_N > \max(x_T^i)$, then it is possible to re-sample from this solution only.

Alternatively, a similar problem can be solved starting from $x_N$, this procedure may be repeated until the condition is achieved.

It is also possible to model other parameter(s) relevant to the trajectory such as acceleration and impose constraints on such parameter(s) as an extension to the problem.

Velocity smoothing should respect zero-velocities in the input trajectory, which indicate full stops. A simple way of achieving this is to split a trajectory into segments separated by stopping events (zero velocity), and to apply the smoothing function to each segment.

Macro Actions

A special kind of maneuver, referred to herein as "macro actions", relieve the planner in two important ways: they specify common sequences of maneuvers, and they automatically set the free parameters in basic maneuvers based on context information (usually road layout).

In this example, the following macro actions are used (with maneuver parameters shown in brackets):
- Continue lane: specifies the sequence<follow lane (until end of visible lane, i.e. lane goal)>
- Exit left/right: specifies the sequence<follow lane (until at/near turning point), cautious (until oncoming traffic is clear/safe distance), turn left/right>. The exit point is automatically set to be the one corresponding to the goal of the ego car, allowing the macro action to skip earlier exit points (this is especially useful in roundabouts).
- Cross road: specifies the sequence<follow lane (until at/near road crossing), cautious (until oncoming traffic from crossing road is clear/safe distance), follow lane (until after road crossing)>
- Overtake: specifies the sequence<lane change right, follow lane (until ego car has passed other car(s)), lane change left>

The applicability condition of a macro action is given by the applicability condition of the first maneuver in the macro action, and possibly additional conditions. For example, the additional condition for <Exit right> is that the car is on the right-most lane in its driving direction, and that the target exit point is on the same lane in front of the car. The additional condition for <Cross road> is that there is a road crossing where the ego car has to give way ahead of another car (see Scenario 3 below). The termination condition of a macro action is given by the last maneuver in the macro action.

Macro actions can significantly speed up the planning and prediction processes, because a single macro action may be sufficient to accomplish a given goal. For example, in Scenario 2 below, if the ego car's goal is G3, then the single macro action<Exit right> will already accomplish the goal.

Macro actions are also useful because they automatically take care of switching points between maneuvers, which otherwise would need to be planned for explicitly (for example, setting the open termination conditions of maneuvers such as lane following).

Macro actions as used in this work do not define a hierarchy of decomposable actions; they simply define sequences of actions in a flexible way. Macro actions are implicitly included in the planning search space.

As noted, for the particular example MCTS process described below, all basic maneuvers in macro actions are closed-loop, and for inverse planning all basic maneuvers are open-loop.

Goals and Goal Generation

Goals for Ego Car

Goals for the ego car are generated based on route planning. A route planner (A25, FIG. 1) takes as input an annotated road map (annotated with lane directions, traffic signs, etc.) and start/end locations. It computes a route from start to end location which specifies the sequence of road segments and directions that the ego car has to travel through. This route is passed down to the planner A6, where it is used to generate goals for the ego car as follows: Conceptually, the planner A6 "zooms into" the map with a view region (e.g. square or circular or any suitable shape) centred on the ego car, similar to the scenario pictures shown below. This view region moves continually with the ego car. At any point in time, the ego car's goal is given either by the next exit point in the route (where the car needs to change from current road to a connecting road) or by the visible end of the current lane if the next exit point in the route is not yet visible. For example, in Scenario 1 below the next exit point is not visible, so the goal is G1. In Scenario 2 below, the exit point becomes visible and the new goal becomes G3.

Goals for Other Cars

Another car's goals may, for example, be defined as its possible exit points and the visible end of road in the car's direction, bounded by the ego car's view region. A heuristic goal generation function is used to enumerate the set of possible goals for a car in a given view region, using information about the road layout and traffic rules (e.g. using the SDL road graph). To reduce compute time when there are many goals (e.g. many exit points), the function may ignore an exit point goal for a car if there are already two earlier exit points on same lane in front of car.

Other types of goals could be specified, such as "I want you to be in front of me". Such goals could be added and removed dynamically based on the current configuration of cars in the environment. The scenario descriptions below give examples of goals.

Goal Recognition

In this example implementation, goal recognition is performed based on "cost penalties" as will now be described with reference to FIG. 10.

A "plan" in the present context means a sequence of one or more basic manoeuvres selected to reach a goal. In some cases, such a sequence of basic maneuvers could be defined by a macro action. With a macro action or some other sequence of multiple basic maneuvers, each basic maneuver is associated with a partial trajectory, and the partial trajectories are combined using velocity smoothing to determine a full trajectory for reaching the goal.

Figure 10:
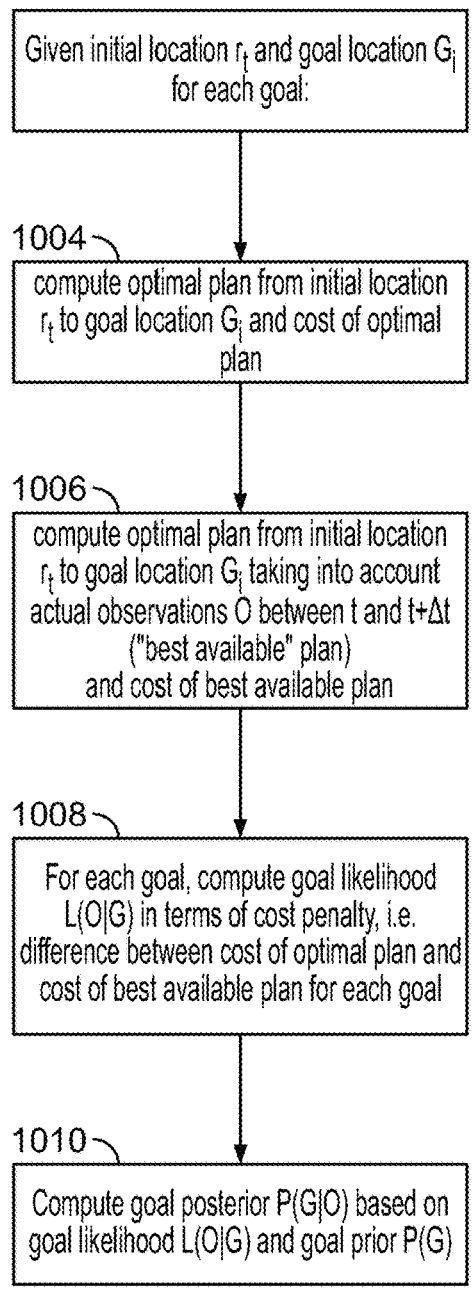
FIG. 10 shows a flowchart for an example inverse planning method.
Figure 10:
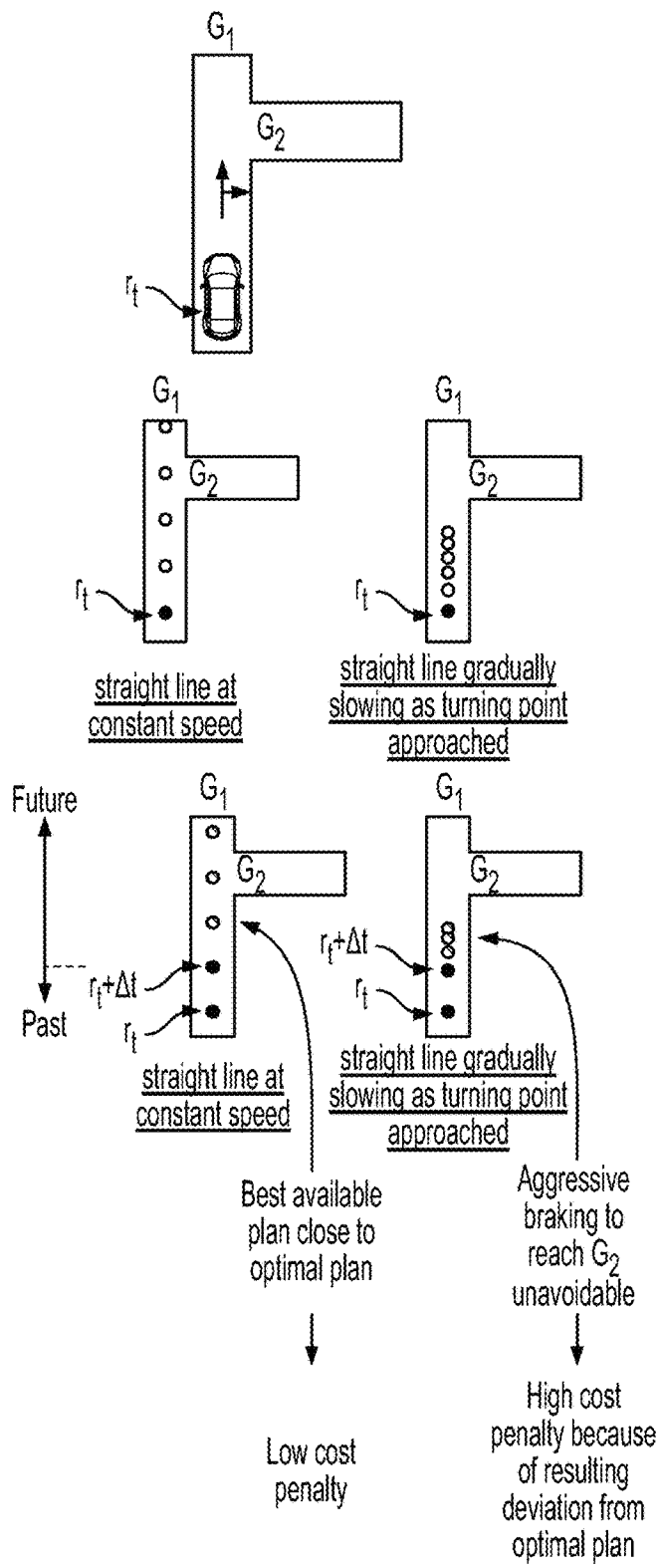

FIG. 10 shows a schematic flowchart for a method of probabilistically inferring a goal of an external actor, from a finite set of available goals, based on cost penalties. The right-hand side of FIG. 10 shows an illustrative example of the steps applied to a scenario with two available goals:

1. $G_1$—continuing along the current road, which is defined as a goal location at the end of the visible road (more generally, as a reference point ahead of the car on the current road);
2. $G_2$—taking a right-turn exist, defined in terms of an exit location.

Given a set of possible goals for an observed car and a sequence of past basic maneuvers executed by the car, a posterior distribution over the goals can be computed using a process of inverse planning. This method computes a Bayesian posterior, $P(G|O) \sim L(O|G) P(G)$, over the possible goals G given a sequence of observations O (e.g. an observed trace $\tau_n$, as in the above examples), a prior distribution P(G) over goals, and the likelihood function L(O|G).

The notations P(O|G) and L(O|G) are equivalent and mean the conditional probability of the observations O given the goal G. The notation "L" is used consistent with the fact that these probabilities are likelihoods in the statistical sense (note that, earlier in this disclosure, the term likelihood is used in the every-day sense and not necessarily this specific statistical. The meaning will be clear in context).

A goal is defined in terms of a goal location, and the notation $G_i$ may be used to represent the goal location for that region. The goal location $G_i$ can be a point in space, but can also be region or could correspond to a particular distance along the road, e.g. a goal location could be defined as a line perpendicular to the road and in that case the car is said to have reached the goal once it reaches that line (irrespective of its lateral position in the road).

The likelihood $L(O|G_i)$ for a given goal $G_i \in G$ is defined as the difference between the respective costs of two plans (the cost penalty):

1. an optimal plan from the car's initial location $r_t$ (at time t) to the goal location $G_i$, i.e. the optimal plan to get from $r_t$ to $G_i$ irrespective of any observed behaviour of the car after time t. This could be executed as a basic maneuver, a macro action or a sequence of multiple basic maneuvers other than a macro action. With multiple basic manoeuvres, the partial trajectories associated therewith are combined to provide an optimal full trajectory for reaching the goal $G_i$ from the initial position $r_t$ (irrespective of any actual observed behaviour of the car after time t); and
2. a "best available" plan—this is defined as an optimal plan from $r_t$ to the goal location $G_i$ given any observed behaviour of the car between time t and time t+Δt, i.e. the best plan to get from $r_t$ to $G_i$ with the additional constraint that this plan must match the behaviour actually observed in the subsequent time interval ΔT. In other words, as the optimal plan from the car's initial location $r_t$ to goal $G_i$ such that the plan respects the observations O. This assumes that cars are more likely to execute optimal plans to achieve goals but allows for a degree of deviation. This could also be executed as a basic maneuver, a macro action or a sequence of multiple basic maneuvers other than a macro action. With multiple basic manoeuvres, the partial trajectories associated therewith are combined to provide a "best available" full trajectory for reaching the goal $G_i$ from the initial position $r_t$ but taking into account the actual observed behaviour of the car in the interval from t to t+Δt. The best available trajectory has an observed portion for the interval [t, t+Δt] which matches the actual observed trajectory and a future portion for a subsequent time interval, chosen so as to minimize an overall cost associated with best available full trajectory (i.e. the full cost of both the observed portion and the future portion).

This is a form of goal recognition because it considers the full path to reach the goal (which may be based on multiple partial trajectories associated with multiple maneuvers).

The cost assigned to a full trajectory can take into account various factors as described later. These include driving time (penalizing trajectories that take longer to reach a goal), safety (penalizing unsafe trajectories) and comfort (e.g. penalizing trajectories with excessive jerk).

The car's initial location $r_t$ may for example be the first observed location of the car. A reasonable approach is to use a moving window of past observations defined by the ego car's sensor ranges to define the initial location $r_t$.

An optimal plan (1 above) is computed for each goal $G_1$, $G_2$ at step 1004 in FIG. 10. Once computed, this allows an optimal trajectory to be determined for each goal $G_1$, $G_2$, for example, using an A* search (see below for details). Having computed the optimal trajectory, a full cost associated with the optimal trajectory can then be computed (also described below). The optimal trajectory is a full trajectory, i.e. for reaching the goal in question from the initial location $r_t$.

In the example of FIG. 10, trajectories are denoted by points along the trajectory that are evenly spaced in time, such that evenly-spaced points imply constant velocity and increasing (resp. decreasing) distance between points implies acceleration (resp. deceleration). White circles are used to represent optimal trajectory points. It can thus be seen that, for goal $G_1$, the optimal trajectory is a straight-line path continuing along the road at constant speed, whereas for goal $G_2$ the optimal trajectory gradually slows as the car approaches a turning point for the exit.

A best available plan (2 above) is computed for each goal $G_1$, $G_2$ at step 1006. As indicated, these take into account actual observations O between time t (when the car was at its initial location $r_t$) and a current time t+Δt. Those observations O may comprise the observed low-level trace τ, represented in FIG. 10 using black circles.

In that context, the observations O may alternatively or additionally comprise a current maneuver of the car, i.e. the probability of each goal may estimate in dependence on a maneuver currently being executed by the car. They may additionally include past observed maneuvers.

Although not shown explicitly in FIG. 10, as described above, probabilistic maneuver detection is applied to predict a probability distribution over possible current maneuvers for the car. Hence, the current maneuver may not be known definitely but only probabilistically, in terms of a distribution $p(M|\tau)$ over possible current manoeuvres. This can be addressed by first sampling a current maneuver $M_j$ from $p(M|\tau)$ and then sampling from the goal probability distribution $p(G|O)$ for that current maneuver $M_j$ (i.e. with the observations O comprising $M_j$).

From the best available plan, a best available trajectory can be determined (see below for details), which in turn allows a full cost to be determined for the best available trajectory (also described below). This is also a full trajectory in the sense of being a complete trajectory from the initial location $r_t$ to the goal location $G_i$. The best available trajectory has an observed portion between time t and t+Δt that matches the actual observed trajectory (i.e. the black circles in FIG. 10) and additionally includes a future portion for the time after t+ΔT, represented in FIG. 10 using diagonally shaded circles.

In the depicted example, it can be seen that both the observed portion (black circles) and the future portion (diagonally shaded circles) of the best available trajectory for goal $G_1$ match the optimal trajectory (white circles) for that goal $G_1$ reasonably well. Therefore, the cost penalty for goal $G_1$—being the difference between the cost of the optimal trajectory and the cost of the best available trajectory—is relatively low.

However, for goal $G_2$, the observed trajectory (black circles) deviates from the optimal trajectory (white circles) fairly significantly, because the car has failed to by time $t+\Delta t$ to the extent required by the optimal trajectory. This discrepancy will not necessarily cause a significant cost penalty per se (it may or may not depending on the details of the implementation). However, as a consequence of the observed behaviour, it can be seen that the future portion of the best available trajectory (i.e. the portion after time $t+\Delta t$) must necessarily include sharp braking (which reflects the fact that the lowest-cost path from the car's current location to $G_2$ must involve sharp braking given the circumstances of the car)—which is penalized by the cost function. This discrepancy from the cost of the optimal trajectory means a higher cost penalty for the goal $G_2$.

At step 1008, for each goal $G_1$, $G_2$, the goal likelihood $L(O|G)$ is computed in terms of the cost penalty, i.e. difference between cost of optimal plan computed at step 1004 and cost of best available plan computed at step 1006 for that goal. This, in turn, allows the goal posterior $P(G|O)$ to be computed (step 1010) based on the goal likelihood and the goal prior.

The prior $P(G)$ can be used to encode knowledge about the "inherent" probability of certain goals. For example, it may be observed, in the scenario of FIG. 10, that cars take the right-turn exist relatively infrequently, which could be encoded as a prior with $P(G_2)<P(G_1)$. This would effectively bias goal $G_1$ in favour of $G_2$. For scenarios without this prior knowledge, each goal could simply be assumed to be equally probable absent any observations of a specific car's individual behaviour, i.e. $P(G_1)=P(G_2)$.

The above assumes that, given a goal, an optimal plan for that goal can be determined given the car's initial location $r_t$, and a best available plan for that goal can be determined given the observations in the subsequent time interval $\Delta T$. It moreover assumes that, given an optimal (resp. best available) plan, an optimal (resp. best available) trajectory can be determined. One mechanism for mapping goals to plans to trajectories in this manner uses an A* search, as will now be described.

Probabilistic Plan Recognition Algorithm

A* Search

An "A* search" is performed over open-loop maneuvers including macro actions. Maneuvers are filtered based on their applicability conditions. If basic maneuvers specify distributions over trajectories, a suitable single trajectory can be selected, e.g. as the mode or most likely trajectory.

An A* search is a known method formulated in terms of a weighted graph of nodes and edges. In the present context, it aims to find an optimal plan for reaching a specified goal $G_i$ from a given location (represented by a starting node). Nodes of the graph represent maneuvers (basic maneuvers or macro actions), and the aim is to find a sequence of nodes (and therefore a sequence maneuvers) which reach the goal at relatively low cost. For each node n, a "cost so far" g(n) is defined as a cost from the starting node to the node n and a heuristic function h(n) provides an estimate of the cost from n to the goal. The search begins at the starting node and, at each node, extends the sequence to the next node having the lowest node cost defined as:

$$f(n)=g(n)+h(n)$$

A simplifying assumption may be used that all other cars in the environment use a constant-velocity model.

For the purpose of finding the optimal trajectory from the initial location $r_t$ to the goal $G_i$, the search begins with the maneuver being by the car executed at time t and the location $r_t$. For the purpose of finding the best available trajectory from the current position $r_{t+\Delta t}$ of the car to the goal given the observations O in the time interval $\Delta t$, the search begins with the detected current manoeuvre and the current position $r_{t+\Delta t}$.

The above-described maneuver detection method can be used to detect maneuvers. Note that this will generally result in a probability distribution over possible current maneuvers. The inverse planning should be done for every predicted current maneuver, as these may lead to different posteriors over goals. Thus, each possible current maneuver produces its own goal posterior. For computational efficiency, only the n-most likely current maneuvers are considered and any other maneuvers are ignored, where n is a method parameter that can be set appropriately.

The cost so far g(n) to reach a current location (current search node) can be defined as an estimated driving time to the current location based on paths and velocities specified by basic maneuvers.

The cost heuristic h(n) to estimate remaining cost to goal is given by the driving time from current location to goal location via straight line at speed limit. Note, in order to guide the search effectively, h(n) only needs to provide an estimate of the minimum remaining cost in order to guide the search. Hence, relatively coarse assumptions can be made here without impacting performance.

After finding an optimal plan, a complete trajectory is generated across maneuvers in the plan. Velocity smoothing is then applied to the complete trajectory and the full cost function is computed (see Cost Function section below) to obtain a final cost of the plan. This last step (applying smoothing and full cost function) makes it possible to pick up on additional "clues" based on velocities, as in the braking example below.

Velocity smoothing is not applied to any part of the trajectory that has already been observed. Otherwise, the effect of velocity smoothing could be to wash out evidence that would hint at certain goals (see below for further details in the context of the example of FIG. 10).

To account for cases in which the car is mid-way through a maneuver (e.g. a lane change), the car's currently executed maneuver needs to be recognized so that is can be completed the before planning further into the future.

To reduce the search space, the basic turn and cautious maneuvers may be removed from the search space, since these are not used outside of macro actions. The lane-follow maneuver can still be useful as a basic maneuver outside a macro action, if its terminal condition is set to some fixed length as a default value.

The present examples does not check for collisions between external actors during inverse planning. Although this could be done, it would make the whole process more expensive. Moreover, due to some simplifying assumptions such as constant velocities of other vehicles, there can be situations where collisions happen inevitably. The multi-agent MCTS method detailed below can handle such collision checking.

Alternatively, the process can be extended to reason about possible collisions as part of inverse planning.

The assumptions set out above in relation to the A* search have been found to provide a good balance between computational efficiency and performance. It will of course be appreciated that different sets of assumptions may be used, such as non-constant velocity models. As another example, the above essentially turns the search problem into a deterministic problem, by considering only the most-likely trajectory associated with a maneuver. However, this can equally be extended to a probabilistic search based on full or truncated trajectory distributions. That is to say, whilst the above considers full/partial trajectory models in the form of single trajectories, the techniques can also be applied to full/partial trajectory distributions.

Multi-threading can be used to speed-up the process, by using independent threads for each goal G. With an additional assumption that cars have independent goals, further parallelisation can be achieved by using one process/thread for each other car.

Braking

Although braking is not recognised as a distinct maneuver in the above method, the method is still able to account for braking in the likelihood of goals.

As an example, consider the scenario shown in FIG. 10 and described above. The optimal plan to G2 from the initial position of the car is given by the Exit right macro action. After applying velocity smoothing, the result is a trajectory that continually slows down until the car reaches the turning point. The cost of this optimal trajectory is denoted by C2.

Assume the car is observed to follow the lane, now half-way closer to the turning point, and slowing down similarly to the optimal trajectory for G2. Hence, if the trajectory to G2 is competed, this results in a trajectory with a cost similar to C2. On the other hand, the optimal trajectory to G1 from the initial state would not involve such braking, leading to a significant cost difference (due to difference in time and possibly jerk). Thus, the posterior probability of G2 increases while the probability of G1 decreases.

(As an aside: it is noted above that velocity smoothing is not applied to any part of the trajectory which has already been observed. The reasoning behind this is apparent in this example: if velocity smoothing were applied to the entire trajectory, then the smoothing would also reduce velocities in the part of the lane-follow maneuver that was already observed. This would lead to a lower cost penalty because the braking is not quite so sudden anymore. In other words, it would make the trajectory more similar to the optimal trajectory from the initial observed position. Therefore, it is appropriate for the smoothing to treat the past trajectory as unmodifiable constants.)

Now assume the car is instead observed to follow the lane but with a constant velocity instead of slowing down. If this trajectory is continued to G2, it will involve a sudden braking, resulting in a cost much higher than C2. On the other hand, continuing the trajectory to goal G1 (staying in lane) is essentially the optimal plan for G1 from the initial state. Thus, G2 decreases in posterior probability and G1 increases.

Finally, assume the car is observed to follow lane and suddenly slows down close to the turning point. This sudden braking will cause a significant cost penalty for both G2 and G1, because it is not in either optimal trajectory from the initial state. Thus, the cost of both goals would increase, causing a smaller change in the relative probability of the two goals.

Goal Recognition Via Goal Trees

As an alternative to the inverse planning method, a decision tree may be used to implement goal detection.

Figure 11:
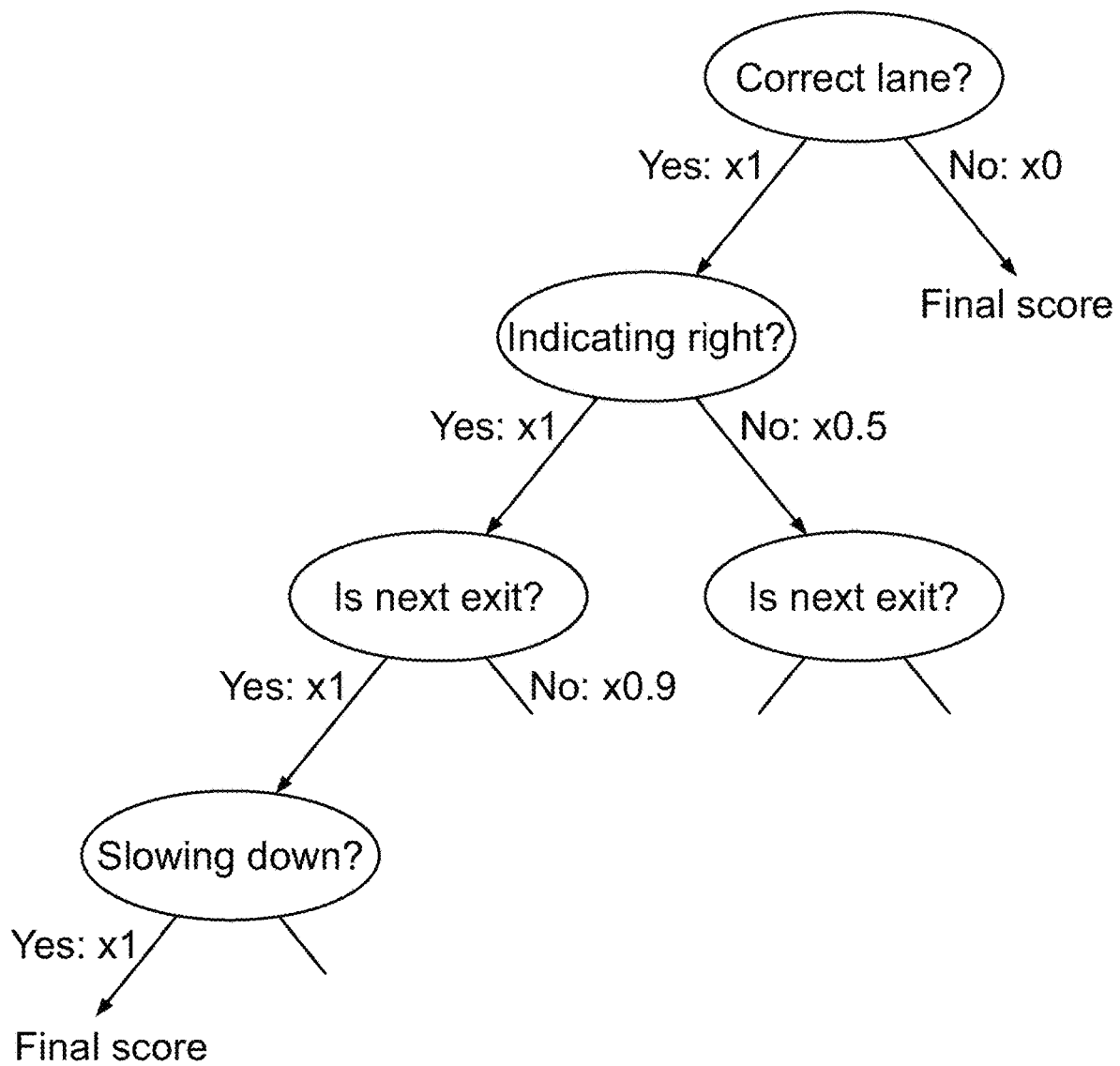
FIG. 11 shows a decision tree for an alternative goal recognition method.

An example of a decision tree for goal recognition is shown in FIG. 11.

Given a set of goals G, a posterior distribution over goals is computed using Bayes law, $P(G|O) \sim L(O|G)P(G)$. The likelihood $L(O|G)$ for goal G is computed by a tree associated with G which can be generated jointly with G. The tree computes a normalised score in the range [0,1] to indicate the likelihood of the goal, with 0 indicating no support for the goal.

An example tree for goal G2 in Scenario 2 (right exit) using example numbers is shown on the right. The tree tests for a few conditions, including:

whether the car is in the correct lane for the goal
whether the car is indicating in the correct direction
whether the exit point is next in line for the car (i.e. there aren't other exit points on same lane closer to car)
whether the car is slowing down In each branching, the tree tests for a condition and multiplies the score (beginning with 1) by some factor in the range [0,1], resulting in a final score at the tree terminating node. Different branches can test for different conditions, and factors given in branches may differ to reflect different importance of test conditions. An alternative to multiplying factors is to add factors along the tree branches and normalising by terminating node depth.

This method of using trees has two main advantages: the trees are cheap to evaluate, and the trees are easy to interpret by humans (adding to explainability).

A decision tree may be constructed based on real-world or simulated driving behaviour data (e.g. from simulation or CCTV), using algorithms such as C4.5 or algorithms for regression tree learning. For example, a collection of binary features (test conditions) can be specified and the tree learning algorithm then finds an optimal subset of features and partial scores given the ground truth data recorded for specific goals.

Predicting Trajectories from Goals

To predict a car's possible trajectories and associated probabilities to a given goal, the same A* search method can be used as used for inverse planning. Rather than terminating A* after it finds the optimal plan, a fixed time budget is imposed instead and the algorithm is permitted to compute a set of plans with associated costs (possibly up to some fixed number of plans). Any time A* search finds a node that reaches the goal, the corresponding plan is added to the set of plans. Trajectories are generated from the plans by connecting the partial trajectories given by the maneuvers in the plan.

A distribution over trajectories extracted from the plans can be computed using a softmax distribution (trajectory model):

$$P(T^{(n)}) = \frac{\exp(-C_n \beta_n)}{\sum_m \exp(-C_m \beta_m)}$$

where $T^{(n)}$ is the n-th full trajectory to the goal, $C_n$ is the cost of the trajectory $T^{(n)}$ (full cost after smoothing), and $\beta_n$ is a scaling factor for the trajectory $T^{(n)}$ (as noted above, the notation $T^{(n)}$ is used for the n-th full trajectory to the goal to distinguish from a partial trajectory $T_j$ for a given maneuver $M_j$). This encodes the assumption that trajectories which are closer to optimal are more likely. The scaling factor could be used to down-weigh specific trajectories based on observed data, i.e. to allow the trajectory prediction model to be trained on relevant examples. Alternatively, a constant scaling factor (e.g. value of 1) could be used.

The above softmax trajectory model can be used as an alternative to the trajectory model obtained via RRT.

As in inverse planning, a set of such trajectories is produced for each predicted current maneuver, focussing on some subset such as the n-most-likely current maneuvers. A* starts after completing the current maneuver, and the final trajectories include the rest of the current maneuver.

This predicts various plausible trajectories rather than a single optimal trajectory, which is beneficial because there are situations in which multiple trajectories achieve (near-)minimal cost but lead to different predictions which in turn may require different behaviour on the part of the ego vehicle.

Integrating Goal Recognition with MCTS

A specific mechanism for integrating goal recognition with the above MCTS manoeuvre planning process will now be described. The combination provides a general interaction-aware maneuver planner.

Sampling Current Maneuver and Goal

FIG. 12 shows schematic overview of a mechanism by which the results of inverse planning can be applied as part of MCTS roll out. This applies principles described above in relation to FIG. 15 described above, in which MCTS is performed multiple times with different samplings of the probabilistic predictions about other agent(s).

The maneuver detector 1102 detects a current maneuver probability distribution for the target actor in the manner described above. For each maneuver $M_i \in M$ (M being the finite set of available maneuvers), this provides a probability that the target actor is currently implementing that manoeuvre, given the observed low-level trace $\tau$, i.e.

$P(M|\tau)$.

Each MCTS super-iteration starts as follows. For each other car:
1. Sample a current maneuver from the set of predicted current maneuvers and their probabilities, i.e. sample a current maneuver $M_j$ based on $P(M|\tau)$ (block 1104, FIG. 12);
2. Sample a goal from the goal posterior $P(G|O)$ corresponding to the sampled current maneuver, i.e. apply the inverse planning steps above with the sampled current maneuver $M_j$ (which may be considered to form part of the observations O).

These samples, i.e. the sampled current maneuver $M_j$ and the sampled goal $G_i$ are used throughout the entire super-iteration of the MCTS process. Steps 1 and 2 above would be performed at the start of each MCTS super-iteration iteration an applied at every node of the tree in that super iteration (from the root note to the terminal nodes).

In FIG. 12, the shorthand notation $P(G|M_i)$ and $P(G|M_k)$ is used to denote the goal posteriors given a current maneuver $M_i$ and $M_j$ respectively—noting that the observations O may be more extensive than simply the current maneuver (e.g. encompassing a sequence of previous maneuver(s)). Using this notation, if at step 1 above, maneuver $M_i$ is sampled, then the goal posterior $P(G|M_i)$ would be sampled from at step 2; whereas if $M_j$ is sampled, the goal posterior $P(G|M_k)$ would be used.

Sampling from the combined posterior prevents inconsistent rollouts. For example, consider a situation in which a car has two possible goals and two predicted current maneuvers with equal probability. The goal posterior for the first maneuver puts all probability on the first goal, while the goal posterior for the second maneuver puts all probability on the second goal. Thus, the combined goal posterior would put equal probability on both goals (by contrast, if one were to sample a goal from the combined goal posterior and then sample a current maneuver, one may end up with a current maneuver for which there is no trajectory to the sampled goal (e.g. there is no path from first maneuver to second goal)).

Single-Agent MCTS with Trajectory Sampling

Given a sampled current maneuver and goal for each other car, their motion trajectories are sampled from the associated set of predicted trajectories and probabilities. These trajectories are used to predict each car's motions along the rollout.

The ego planning is done over the set of closed-loop maneuvers, including macro actions, which are applicable in the current state. In many cases, a single macro action may be sufficient to accomplish the goal of the ego car. An aim is to find such macro actions as soon as possible during the planning. A simple approach is to order the set of maneuvers such that macro actions will always be tried first; alternatively, a "best first guess" function may be provided which, for a given goal, returns the macro action that usually achieves the goal. If a macro action is not currently applicable (e.g. Exit left when ego car is in middle lane), then ideally the planner should quickly find a way to make it applicable (e.g. first use the basic lane change left maneuver, then use macro action for Exit left).

After choosing a maneuver for the ego vehicle, the environment is simulated forward until the end of the maneuver. This includes forward-simulating the trajectories of other cars to the same point in time as the ego vehicle, as well as any other modelled processes in the environment. A collision checker is applied to check whether the ego vehicle collides with any of the other vehicles during the forward simulation. If there is a collision, that branch in the search tree is immediately "cut" (i.e. no longer explored).

MCTS uses the cost function defined in section below. To ensure that MCTS only generates plans that accomplish the goal, the cost function is only applied if and when the rollout reaches the goal. More precisely, the cost function is applied to the trajectory generated by the maneuvers in the rollout, after applying velocity smoothing. The resulting cost of the smoothed trajectory is then propagated up the search tree. Thus, MCTS only searches for feasible plans that achieve the goal, and among those, searches for the best one.

The use of macro actions means successful plans will typically contain 1-5 maneuvers (including macro actions). Hence, to speed up the search, the MCTS search can be cut (terminated) at depth 5.

A pseudo code algorithm for single-agent MCTS with goal recognition is provided in Annex B.

Speed Enhancements

Possible speed enhancements include:
  It may be possible to use various degrees of multi-threading in MCTS, e.g. using multiple threads to generate rollouts and update statistics.
  Computation costs may be reduced by planning over open-loop maneuvers rather than closed-loop maneuvers, at the cost of reduced planning quality. The maneuver to be executed after MCTS planning is always closed-loop.

Cost Function

A cost function is used for inverse planning and MCTS to quantify the cost of a driving trajectory. A trajectory, T, consists of a reference path to be followed by the vehicle and a sequence of target velocities along the path. The cost function takes as input a trajectory and returns a real-valued cost, C(T). The cost function should be cheap to evaluate for any given trajectory, and the computation cost should grow at most $O(|T|)$.

The cost may for example be defined as a weighted (linear) sum of several cost factors. These include:

Time: How much time does the car need to complete the trajectory? (Note: this is not the same as length of reference path since it also depends on target velocities.)

Curvature: How "curvy" is the trajectory? Tighter curvature should result in exponentially higher cost. Angular velocity could be used as proxy.

Velocity changes: How much do velocities change along the trajectory? High rate of change (e.g. sudden slow-down) should result in exponentially higher cost.

"Safety": As a proxy to safety, a "cost factor" can be computed as a function of the smallest distance to any other vehicle during the trajectory, with exponential costing (vehicles beyond a distance threshold are ignored). That is, such that the cost increases exponentially as the smallest distance reduces.

Most of these cost factors can be computed iteratively by stepping forward in time through the trajectory and doing some simple calculations based on old/new location vectors and target velocities. The weighting of cost factors will need to be tuned based on empirical testing.

Normalisation

To ensure comparability of different cost factors, it is helpful to normalise all cost factors to the same range [0,1]. It also helps to normalise the weighting, such that weights are non-negative and sum up to 1. Together, these normalisation steps ensure that C(T) is in [0,1], which satisfies the assumption in UCB/UCT that costs are in the [0,1] range.

Normalisation may be easier to achieve if cost factors are defined as min/max functions (e.g. max yaw rate, min distance to other cars).

An alternative and cheaper approach is to associate costs with maneuvers rather than trajectories. For example, to define the cost of a plan as the number of basic maneuvers in the plan. This can be an appropriate approach if there is no or little variability in the trajectories generated by maneuvers (e.g. a lane change which always follows the same poly-spline). However, if maneuvers generate bundles of trajectories, or if the trajectories can depend on dynamic aspects such as vehicle configuration (e.g. lane-changing behind a close vehicle vs lane-changing behind a not-so-close vehicle), then it might not be appropriate to assign fixed cost to maneuvers because the same maneuver may lead to significantly different trajectories depending on circumstances.

EXAMPLE SCENARIOS

Three example scenarios will now be described to illustrate the concept of goals and highlight how goal recognition can inform the ego car's decisions. The scenarios also show some borderline situations for the proposed method. The three scenarios are represented in FIGS. 13A to 13C respectively.

Figure 14C:
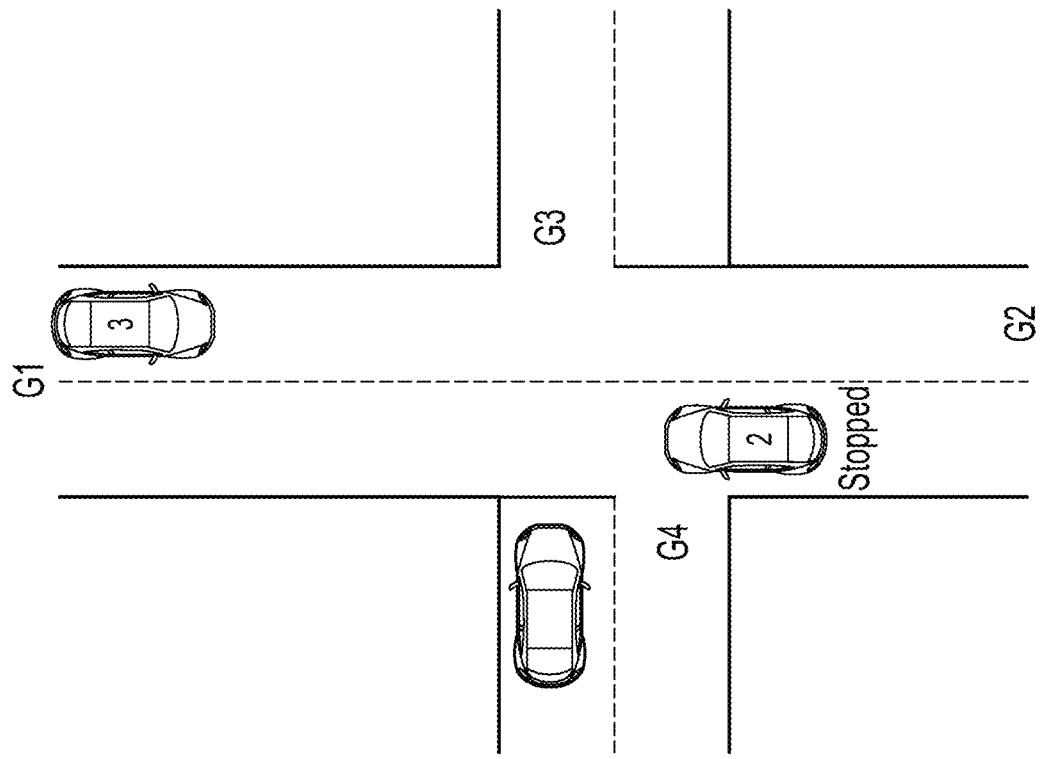
FIGS. 14A-C show example scenarios in which the described techniques may be implemented.
Figure 14B:
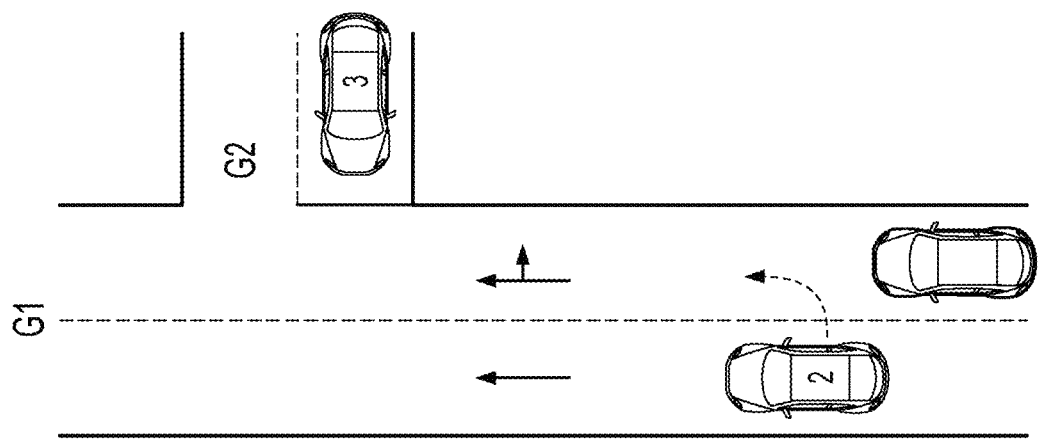
Figure 14A:
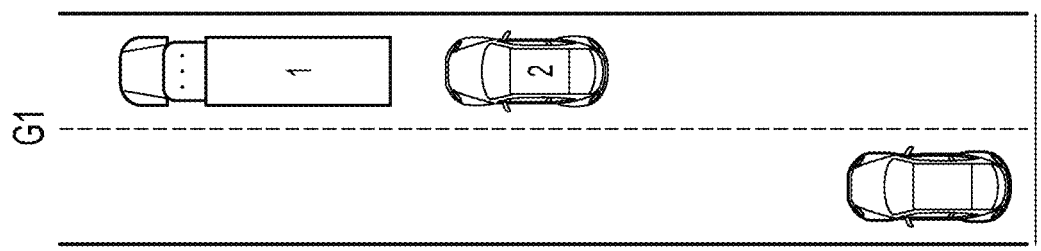

Scenario 1: Car Overtaking Slow Truck (FIG. 14A)

Car 2 is driving behind a slow-moving Truck 1. One goal location for Car 2, denoted G1, is shown. In this scenario, it is possible that Car 2 may move into the ego lane to overtake the truck.

The myopic baseline alone would place most/all posterior probability on the lane-follow maneuver for Car 2, failing to predict that a lane-change may be imminent as it does not reason about future maneuvers.

Assuming that Car 2 uses a similar cost function as ego car (i.e. including time factor), and planning inversely for Car 2 to achieve G1, the method may predict a lane-change maneuver for Car 2 followed by lane-following at speed limit. If Car 2 is a good distance away from ego car, then this prediction will probably not cause the ego car to react. However, if Car 2 is close to ego car (as in picture), then the ego car may decide to slow down and keep a distance to Car 2.

Scenario 2: Car Changing Lanes to Exit (FIG. 14B)

Two possible goals for the other cars, G1 and G2, are generated based on road layout. Both G1/G2 are possible for Car 2, but only G1 is possible for Car 3.

Car 2 is observed executing a right lane change. Based on inverse planning for Car 2 and each possible goal, the lane change is highly indicative of G2. After the lane change, the optimal plan for G2 prescribes a follow-lane with reducing speed (due to velocity smoothing) followed by a right-turn. Taking this sequence into account and assuming the ego vehicle's goal is G1, the MCTS planner may realise that the slow-down of Car 2 penalises an ego vehicle objective function too much (because it forces the ego vehicle to slow down, too), so it may decide to change lanes to the left after Car 2 has completed its lane change.

The myopic baseline would only recognise that Car 2 is changing to the right lane, but would fail to predict the subsequent slow-down. The baseline would probably still execute a lane change, but only after the slow-down is already in progress.

Scenario 3: Moving in Front of Waiting Car (FIG. 14C)

Four possible goals for the other cars are indicated based on road layout. The ego car is waiting at the crossing.

No slow-down for Car 3 is observed, indicating that G2 is most likely (but G3/4 are still possible, albeit at cost of strong braking).

Car 2 has stopped in shown position, matching the plan for reaching G3: Because Car 3 is oncoming and uses a constant velocity, Car 2 has to stop, wait for Car 3 to pass, then turn right into G3. In contrast, stopping on the shown position is not indicative of either G1 or G4 (G2 is not a valid goal for Car 2).

Given this constellation of inferred goals and plans, the ego car may realise that it can safely turn left onto the road while Car 2 is waiting for Car 3 to pass.

The myopic baseline would recognise the stopping maneuver of Car 2, but would be unable to predict subsequent maneuvers.

Data-Driven Behaviour Models

As described above, learned behaviour of actors may be used within MCTS simulations to provide realistic simulations. Such generative behaviour models can be used in conjunction with inverse planning, or as an alternative to inverse planning, i.e. learned generative behaviour models may be used without implementing inverse planning (e.g. one or more trajectories may simply be generated using a learned model without needing to reason over goals, maneuvers etc.). As noted, examples such models include spatial Markov models and neural networks.

For example, the generative behaviour model may be a spatial Markov model (SMM) based on a plurality of spatial regions within the monitored driving area, in which at least one of the following is computed: an estimated occupancy probability associated with each spatial region, and an estimated transition probability associated with each of a plurality of spatial region pairs.

The spatial regions may be cells of a grid overlaid on the monitored driving area. This may take into account road structure and/or other structure in the monitored driving area, which may be manually annotated or determined from a map (for example).

The notation $p_i$ means the estimated occupancy probability for spatial region i and $p_{i,j}$ means the estimated probability of a transition from spatial region i to spatial region j. With a SMM, p(T|Model) may be determined based on the occupancy and/or transition probabilities associated with a series of the grid cells (or other spatial regions) traversed by a driving path (trajectory) T given the model Model.

The driving behaviour data can comprise any form of sensor data, such as image data and/or motion sensor data etc. The data can be collected in any suitable manner, but CCTV (close circuit television) systems provide a particularly convenient means of collecting driving behaviour data, particularly in urban environments with good CCTV coverage. For example, the present disclosure recognizes that CCTV from complex driving contexts (e.g. complex roundabouts, multi-lane junctions, blind corners etc.) provides a rich source of driving behaviour data.

In the following examples, real life driving behaviour data, such as CCTV image data, is used to both generate models for training and for predicting behaviour of actors while driving.

Real life data may be collected for a fixed area over a period of time. The period over which data is collected may be, for example, 24 hours to try to generate an accurate representation of the movement of traffic through the area. Locations may be small, such as a junctions. An area may be chosen which have a high volume of traffic passing through them to maximize the potential for data collection.

Data about the road layout (driving context) is be collected. This may be from a map, such as a HD (high definition) map, or it may be collected from the CCTV footage, and inputted either manually or automatically. For example, the CCTV footage may be manually annotated.

Information about the locations and movements of the actors in the collected data is extracted from the collected data, and used to build a spatial Markov (state-transition) model (SMM) of normal driving behaviour. The state-transition model is a discrete cell approximation model may be used to provide a simplified representation of normal behaviour. To achieve this, a grid may be applied to the location captured in the CCTV footage. This grid may be in the range of 5-10 cm per cell.

The behaviour of the agents in each grid cell may then be analysed over the time period in question. The information that is extracted in this analysis may for example include the frequency of occupancy of each grid element over the time period of the collected data, and the number of transitions made during the time period from each element to its surrounding elements. This information can then be used to assign an occupancy probability estimate $p_i$ to each grid cell and a transition probability estimate $p_{i,j}$ to each pair of grid cells i, j.

Figure 16:
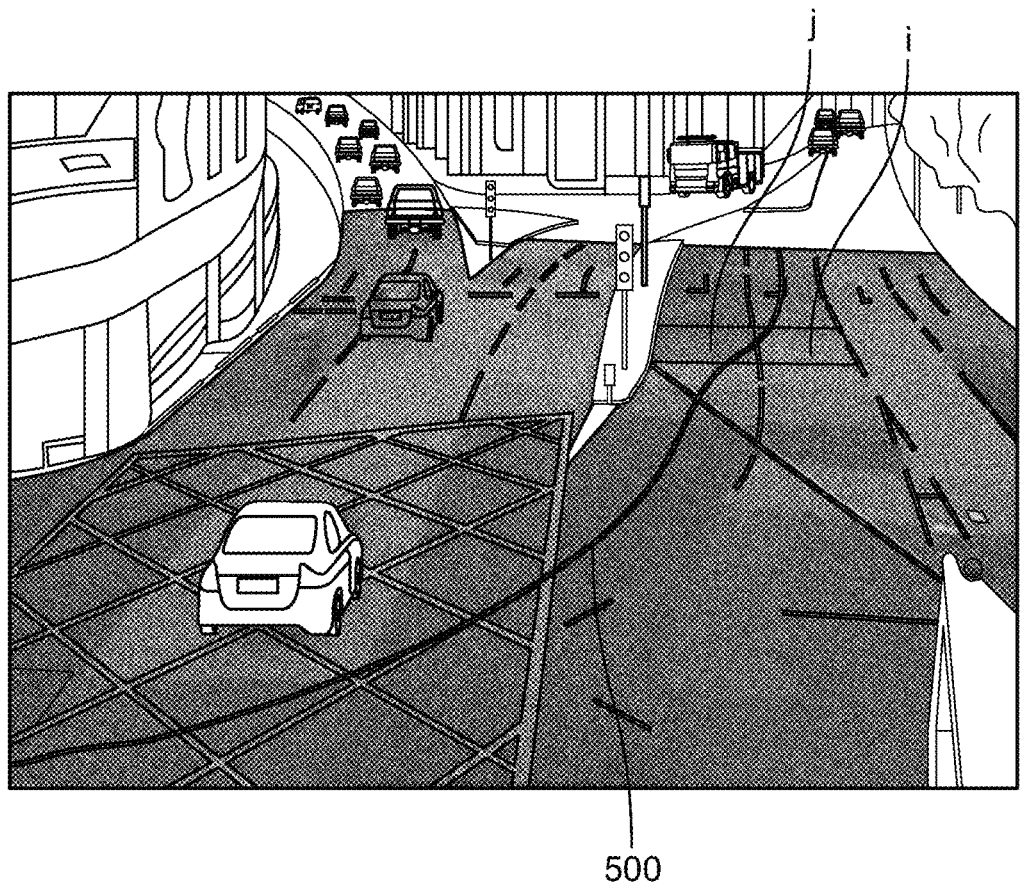
FIG. 16 shows an example of a spatial Markov model which models normal driving behaviour in an area monitored by CCTV

By way of example, FIG. 16 shows a SMM determined for road layout within the field of view of a CCTV camera. The road layout in this case is part of a relatively complex junction, on which fixed grid has been superimposed. Two cells of the grid are denoted by reference signs i and j by way of example, and have occupancy probabilities $p_i$ and $p_j$ determined through observation of real-world traffic. The transition probability $p_{i,j}$ between cells i and j is the probability of an actor moving directly from cell i to cell j, also determined through observation.

As will be appreciated, the above description only considers some examples of suitable models for modelling expected vehicle behaviour. Other examples of suitable models include Markov Decision Process models and rewards to the data. In this case, training is performed by fitting a Markov Decision Process model and rewarding to the data.

At the hardware level, the on-board computer system A1 of the AV comprises execution hardware capable of executing algorithms to carry out the above functions. Whilst the execution hardware can be general purpose or special purpose execution hardware, or any combination thereof, it will generally comprise one or more processors such as central processing units (CPUs) and which may operate in conjunction with specialized hardware such as, but not limited to, accelerators (e.g. GPU(s)), field programmable gate-arrays (FPGAs) or other programmable hardware, and/or application-specific integrated circuits (ASICs) etc. Given the need to perform complex data processing operations, often using sophisticated and complex ML/AI models, with sufficient accuracy and speed (often in real-time) to ensure safe and reliable operation, the on-board computer system may be highly sophisticated, possibly with specialized computer hardware tailored to implement the models and algorithms in question. Particularly given the speed at which innovation is progressing in the field of AI, it will be appreciated that the architecture of the AV on-board computer system A1 at both the hardware level and the functional/software level may take numerous forms. Herein, functional components and the like embodied in a computer system—such as the data processing component A2, prediction component A4 and AV planner A6—are high-level representation of particular functionality implemented by the computer system, i.e. functions performed by whatever (combination of) general purpose and/or specialized hardware of the computer system that is appropriate in the circumstances.

Annex A—Scenario Description Example

```
{
    "road-layout" : [
        {
            "lanes" : [
                {"index" : -1, "width" : 3.65, "left" :
"double", "right" : "double"}
            ],
            "midline" : [
                [25.0, 30.0],
                [26.46, 33.53],
                [30.0, 35.0],
                [33.53, 33.53],
                [35.0, 30.0],
                [33.53, 26.46],
                [30.0, 25.0],
                [26.46, 26.46],
                [25.0, 30.0]
            ]
        },
        {
            "lanes" : [
                {"index" : -1, "width" : 3.65, "left" :
"double", "right" : "double"},
                {"index" : 1, "width" : 3.65, "left" :
"double", "right" : "double"}
            ],
```

```
            "midline" : [
                [30.0, 26.0],
                [30.0, 25.0],
                [30.0, 20.0],
                [30.0, 15.0],
                [30.0, 10.0],
                [30.0, 5.0]
            ]
        },
        {
            "lanes" : [
                {"index" : -2, "width" : 3.65, "left" :
"double", "right" : "double"},
                {"index" : -1, "width" : 3.65, "left" :
"double", "right" : "double"}
            ],
            "midline" : [
                [26.0, 30.0],
                [25.0, 30.0],
                [20.0, 30.0],
                [15.0, 30.0],
                [10.0, 30.0],
                [5.0, 30.0]
            ]
        },
        {
            "lanes" : [
                {"index" : 1, "width" : 3.65, "left" :
"double", "right" : "double"}
            ],
            "midline" : [
                [34.0, 30.0],
                [35.0, 30.0],
                [40.0, 30.0],
                [45.0, 30.0],
                [50.0, 30.0],
                [55.0, 30.0]
            ]
        },
        {
            "lanes" : [
                {"index" : -1, "width" : 3.65, "left" :
"double", "right" : "double"}
            ],
            "midline" : [
                [30.0, 34.0],
                [30.0, 35.0],
                [30.0, 40.0],
                [30.0, 45.0],
                [30.0, 50.0],
                [30.0, 55.0]
            ]
        }
    ]
}
```

Annex B

---

Pseudo code for single-agent MCTS with goal recognition while compute budget not used up
 for each other car, sample a current maneuver, goal and trajectory
 perform rollout from current state until goal reached, or maximum rollout length reached:
  select ego maneuver from current state // e.g. using UCB rule or some other exploration, together with priority mechanism for macro actions
  simulate ego maneuver until it terminates // if the maneuver is a macro action, we simulate through the entire sequence within the macro action
  simulate all other cars forward to same point in time as ego car, using their sampled trajectories
  if ego car collides with other car in simulation segment: cut the search branch and select different maneuver

---

Pseudo code for single-agent MCTS with goal recognition if new state achieves the goal: extract ego trajectory, apply velocity smoothing, and compute cost function
  propagate resulting cost up the search tree
 select best maneuver for current state (e.g. minimum expected cost or most visited)

---

The invention claimed is:

1. Non-transitory computer-readable media having embodied thereon computer-readable instructions configured to cause, when executed on one or more hardware processors, the one or more hardware processors to:
 plan autonomous vehicle (AV) manoeuvers in an encountered driving scenario, by executing a tree search algorithm to determine a sequence of AV manoeuvres corresponding to a path through a constructed game tree;
 wherein the constructed game tree has a plurality of nodes representing anticipated states of the encountered driving scenario, and the anticipated driving scenario state of each child node is determined by updating the driving scenario state of its parent node based on (i) a candidate AV manoeuvre and (ii) an anticipated behaviour of at least one external agent in the encountered driving scenario; and
 wherein the anticipated behaviour of the external agent is simulated by applying an inverse planning method to one or more observed parameters of the external agent, wherein the inverse planning method comprises:
  determining a set of available goals or manoeuvers for an external agent in the encountered driving scenario,
  for each goal or manoeuver of the set of available goals or manoeuvers, determining an expected trajectory model,
  comparing an observed trace of the external agent over a time interval with the expected trajectory model for each goal or manoeuver of the set of available goals or manoeuvers, to determine a likelihood of the goal or manoeuver, and
  using the determined likelihood of at least one goal or manoeuver of the set of available goals or manoeuvers to simulate the anticipated behaviour of the external agent.

2. The non-transitory computer-readable media of claim 1, configured to implement operations comprising:
 receiving sensor inputs pertaining to an AV;
 processing the sensor inputs to determine the encountered driving scenario;
 applying object tracking to the sensor inputs to track the external agent in the encountered driving scenario and determine the observed trace of the external agent, wherein the one or more observed parameters are derived from the sensor inputs.

3. The non-transitory computer-readable media of claim 1, wherein using the determined likelihood of the at least one goal or manoeuver to simulate the anticipated behaviour of the external agent comprises computing at least one predicted trajectory for the external agent based on the expected trajectory model for the at least one goal or manoeuver and the determined likelihood of the at least one goal or manoeuver.

4. The non-transitory computer-readable media of claim 1, wherein the expected trajectory model for each goal or manoeuver is a single expected trajectory or a distribution of expected trajectories associated with the goal or manoeuver.

5. The non-transitory computer-readable media of claim 1, wherein the observed trace is used to predict a best-available trajectory model for the goal or manoeuver, wherein comparing the observed trace with the expected trajectory model comprises comparing the best-available trajectory model with the expected trajectory model.

6. The non-transitory computer-readable media of claim 5, wherein the observed trace is used to predict a current manoeuver and/or a future manoeuver of the external agent, the predicted current or future manoeuver being used to determine the best-available trajectory model.

7. The non-transitory computer-readable media of claim 5, wherein a sequence of multiple manoeuvers is determined for at least one goal, the best-available trajectory model being determined for the at least one goal based on partial trajectory models, each associated with a manoeuver of the sequence of multiple manoeuvers.

8. The non-transitory computer-readable media of claim 7, wherein each partial trajectory model comprises one or more target motion values, and one or more motion values of a future portion of the best-available trajectory model are determined by applying motion smoothing to the target motion values.

9. The computer-readable instructions of claim 5, wherein a defined cost function is applied to both the expected trajectory model and the best-available trajectory model for each goal, to determine respective costs thereof, and comparing the best-available trajectory model with the expected trajectory model comprises comparing the respective costs thereof.

10. The non-transitory computer-readable media of claim 9, wherein the computer-readable instructions are configured to generate AV control signals for controlling an autonomous vehicle to implement a manoeuver.

11. The non-transitory computer-readable media of claim 1, wherein the anticipated behaviour of the external agent is simulated by sampling a goal or manoeuver from the set of available goals or manoeuvers based the likelihood of each goal or manoeuver.

12. The non-transitory computer-readable media of claim 11, wherein the set of available goals or manoeuvers is a set of available goals, wherein different goal distributions are determined for different manoeuvers or manoeuver sequences, and the anticipated behaviour of the external agent is simulated by sampling a manoeuver or manoeuver sequence from a set of possible manoeuvers based on a manoeuver distribution, and then sampling the goal from the set of available goals based on a goal distribution determined for that manoeuver or manoeuver sequence, of the different goal distributions determined for the different manoeuvers or manoeuver sequences.

13. The non-transitory computer-readable media of claim 12, wherein the manoeuver distribution is determined using inverse planning at manoeuver level, which comprises:
for each manoeuver of the set of possible manoeuvers, determining an expected trajectory model, and
comparing the observed trace of the external agent with the expected trajectory model for each manoeuver, to determine a likelihood of the manoeuver.

14. The non-transitory computer-readable media of claim 1, wherein the tree search algorithm is performed multiple times for multiple constructed game trees with different sampled goals, and the sequence of AV manoeuvers is determined based on a statistical analysis of paths within the multiple constructed game trees.

15. A computer system comprising:
memory having embodied thereon computer-readable instructions; and
one or more hardware processors coupled to the memory, the computer-readable instructions configured, when executed on the one or more hardware processors, to cause the computer system to:
plan an autonomous vehicle (AV) manoeuver in an encountered driving scenario, by executing a tree search algorithm to determine a sequence of AV manoeuvres corresponding to a path through a constructed game tree;
wherein the constructed game tree has a plurality of nodes representing anticipated states of an encountered driving scenario, and the anticipated driving scenario state of each child node is determined by updating the driving scenario state of its parent node based on (i) a candidate AV manoeuvre and (ii) an anticipated behaviour of at least one external agent in the encountered driving scenario; and
wherein the anticipated behaviour of the external agent is simulated by applying an inverse planning method to one or more observed parameters of the external agent, wherein the inverse planning method comprises:
determining a set of available goals or manoeuvers for an external agent in the encountered driving scenario,
for each goal or manoeuver of the set of available goals or manoeuvers, determining an expected trajectory model,
comparing an observed trace of the external agent over a time interval with the expected trajectory model for each goal or manoeuver of the set of available goals or manoeuvers, to determine a likelihood of the goal or manoeuver, and
using the determined likelihood of at least one of goal or manoeuver of the set of available goals or manoeuvers to simulate the anticipated behaviour of the external agent.

16. A method of planning autonomous vehicle (AV) manoeuvers in an encountered driving scenario, the method comprising:
planning an AV manoeuver in an encountered driving scenario, by executing a tree search algorithm to determine a sequence of AV manoeuvres corresponding to a path through a constructed game tree;
wherein the constructed game tree has a plurality of nodes representing anticipated states of the encountered driving scenario, and the anticipated driving scenario state of each child node is determined by updating the driving scenario state of its parent node based on (i) a candidate AV manoeuvre and (ii) an anticipated behaviour of at least one external agent in the encountered driving scenario; and
wherein the anticipated behaviour of the external agent is simulated by applying a generative behaviour model to one or more observed parameters of the external agent as derived from sensor inputs, the generative behaviour model being a machine learning (ML) model which has been trained based on examples of observed, real-world driving behaviour.

17. The method of claim 16, wherein at least some of the examples of observed, real-world driving behaviour used to train the generative model have been extracted from closed circuit television data.

18. The method of claim 16, wherein the generative behaviour model comprises a trained neural network.

19. The method of claim 16, wherein the anticipated behaviour of the external agent is simulated using learned occupancy and/or transition probabilities of a spatial Markov model learned for a driving area of the encountered driving scenario.

20. The method of claim 16, wherein the generative behaviour model is applied to: an observed trace of the external agent, one or more ego vehicle parameters, and one or more parameters of the encountered driving scenario.

* * * * *